(12) United States Patent
Zawacky et al.

(10) Patent No.: US 8,884,059 B2
(45) Date of Patent: *Nov. 11, 2014

(54) ELECTRODEPOSITABLE COATING COMPOSITION CONTAINING A CYCLIC GUANIDINE

(75) Inventors: Steven R. Zawacky, Pittsburgh, PA (US); Thomas C. Moriarity, Allison Park, PA (US); Donald W. Boyd, Cheswick, PA (US); Geoffrey R. Webster, Gibsonia, PA (US); Joseph Lucas, Allison Park, PA (US); Alan J. Kaylo, Glenshaw, PA (US); Chester J. Szymanski, Allison Park, PA (US); Venkatachalam Eswarakrishnan, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 849 days.

This patent is subject to a terminal disclaimer.

(21) Appl. No.: 12/884,739

(22) Filed: Sep. 17, 2010

(65) Prior Publication Data

US 2011/0005937 A1    Jan. 13, 2011

Related U.S. Application Data

(63) Continuation of application No. 11/835,600, filed on Aug. 8, 2007, now Pat. No. 7,842,762.

(51) Int. Cl.
C09D 5/44 (2006.01)

(52) U.S. Cl.
CPC ................................. *C09D 5/4496* (2013.01)
USPC ............ 564/230; 564/235; 564/57; 564/117; 564/459; 564/460; 564/461

(58) Field of Classification Search
USPC ............ 564/230, 235, 57, 117, 459, 460, 461
See application file for complete search history.

(56) References Cited

U.S. PATENT DOCUMENTS

| | | | |
|---|---|---|---|
| 3,945,961 A | 3/1976 | Blank | |
| 4,297,255 A | 10/1981 | Schenck et al. | |
| 4,546,165 A | 10/1985 | Grogler et al. | |
| 4,568,719 A | 2/1986 | Tada et al. | |
| 4,617,281 A * | 10/1986 | Green | 502/62 |
| 4,663,472 A | 5/1987 | Green | |
| 4,757,116 A | 7/1988 | Greco et al. | |
| 4,761,337 A | 8/1988 | Guagliardo et al. | |
| 4,869,772 A | 9/1989 | McDonnell et al. | |
| 4,874,822 A | 10/1989 | Rasmussen et al. | |
| 5,268,473 A | 12/1993 | Moren et al. | |
| 5,506,279 A | 4/1996 | Babu et al. | |
| 5,998,013 A | 12/1999 | Shoshi et al. | |
| 6,057,034 A | 5/2000 | Yamazaki et al. | |
| 6,075,065 A | 6/2000 | Yamazaki et al. | |
| 6,245,922 B1 | 6/2001 | Heilmann et al. | |
| 6,506,858 B1 | 1/2003 | Knuuttila et al. | |
| 6,617,399 B2 | 9/2003 | Konarski | |
| 6,635,690 B2 | 10/2003 | Heilmann et al. | |
| 6,743,921 B2 | 6/2004 | Tucker et al. | |
| 6,852,193 B2 | 2/2005 | Kneafsey et al. | |
| 6,894,082 B2 | 5/2005 | Brantl et al. | |
| 6,936,641 B2 | 8/2005 | Molock et al. | |
| 7,012,120 B2 | 3/2006 | Klemarczyk et al. | |
| 7,015,286 B2 | 3/2006 | Heilmann et al. | |
| 7,074,858 B2 | 7/2006 | Heilmann et al. | |
| 7,109,061 B2 | 9/2006 | Crane et al. | |
| 7,211,616 B2 | 5/2007 | Kaszubski et al. | |
| 7,384,984 B2 | 6/2008 | Lewandowski et al. | |
| 2003/0061825 A1 | 4/2003 | Sullivan | |
| 2003/0092694 A1 | 5/2003 | Nilsson et al. | |
| 2003/0164222 A1 | 9/2003 | Kneafsey et al. | |
| 2003/0181318 A1 | 9/2003 | Tucker et al. | |
| 2003/0185788 A1 | 10/2003 | Rothbard et al. | |
| 2004/0059044 A1 | 3/2004 | Olson et al. | |
| 2004/0063848 A1 | 4/2004 | Olson et al. | |
| 2005/0182148 A1 | 8/2005 | Gaud et al. | |
| 2005/0211580 A1 | 9/2005 | Kaszubski et al. | |
| 2005/0288457 A1 | 12/2005 | Liu et al. | |
| 2005/0288458 A1 | 12/2005 | Klemarczyk et al. | |
| 2006/0004119 A1 | 1/2006 | Molock et al. | |
| 2006/0046068 A1 | 3/2006 | Barancyk et al. | |
| 2006/0068198 A1 | 3/2006 | Bratys et al. | |
| 2006/0158001 A1 | 7/2006 | Emch et al. | |
| 2006/0229419 A1 | 10/2006 | Eswarakrishnan et al. | |
| 2007/0048445 A1 | 3/2007 | DiMario | |
| 2007/0048504 A1 | 3/2007 | DiMario | |

FOREIGN PATENT DOCUMENTS

| | | |
|---|---|---|
| EP | 0152240 A2 | 8/1985 |
| EP | 0295930 | 12/1988 |
| EP | 0380178 | 8/1990 |
| EP | 0449488 | 10/1991 |
| EP | 0554023 A1 | 8/1993 |
| EP | 0837844 A1 | 4/1998 |
| EP | 0874012 | 10/1998 |
| EP | 1401976 | 3/2004 |
| EP | 1788035 | 5/2007 |
| JP | 02189330 A | 7/1990 |
| JP | 6033332 B | 8/1994 |
| JP | 10265612 | 10/1998 |
| JP | 11021352 | 1/1999 |
| JP | 2000273280 | 10/2000 |
| JP | 2006199721 | 8/2006 |
| WO | 0192434 | 12/2001 |
| WO | 2007037484 | 4/2007 |

OTHER PUBLICATIONS

Rappo-Abiuso, Phys. Chem. Chem. Phys., 2001, 3, 99-106.*
Rao, Angew. Chem. Int. Ed. Engl. 1997, 36, pp. 2661-2663.
Rappo-Abiuso, Maria, et al., "Hydrogen-bonded complexes of pentaalkyl guanidines", Phys. Chem. Chem. Phys., 2001, 3, 99-106.

* cited by examiner

Primary Examiner — Robert C Boyle
(74) Attorney, Agent, or Firm — Alicia M. Passerin

(57) ABSTRACT

The present invention is directed towards an electrocoating composition comprising a cyclic guanidine.

35 Claims, No Drawings

ELECTRODEPOSITABLE COATING COMPOSITION CONTAINING A CYCLIC GUANIDINE

CROSS-REFERENCE TO RELATED APPLICATION

This patent application is a Continuation of U.S. patent application Ser. No. 11/835,600 filed on Aug. 8, 2007, the entirety of which is incorporated herein by reference.

BACKGROUND OF THE INVENTION

1. Field of the Invention

The present invention is directed towards an electrodepositable coating composition comprising a cyclic guanidine.

2. Background Information

Dialkyltin oxides have traditionally been used as cure catalysts for electrodeposition coatings. Dialkyltin oxides, however, have been subjected to a number of regulatory restrictions by various countries due to environmental concerns. Therefore, bismuth has been used with increased frequency as the cure catalyst for electrodeposition coatings in lieu of dialkyltin oxide. There are, however, a number of shortcomings associated with using bismuth as the cure catalyst. For example, bismuth is often a less effective catalyst for various electrodeposition compositions when compared to dialkyltin oxide. Moreover, there may be cost and availability issues associated with using bismuth as a cure catalyst in the future. Accordingly, there is a need for an alternative catalyst for use in an electrodeposition coating. Moreover, there is also a need for an electrodeposition coating that is substantially free of tin.

SUMMARY OF THE INVENTION

The present invention is directed to an electrodepositable coating composition comprising a cyclic guanidine.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" cyclic guanidine, "a" polymer, "a" crosslinker, and any other component refer to one or more of these components.

When referring to any numerical range of values, such ranges are understood to include each and every number and/or fraction between the stated range minimum and maximum.

As employed herein, the term "polyol" or variations thereof refers broadly to a material having an average of two or more hydroxyl groups per molecule.

As used herein, the term "polymer" refers broadly to prepolymers, oligomers and both homopolymers and copolymers. It should be noted that the prefix "poly" refers to two or more.

As stated above, the present invention is directed to an electrodepositable coating composition comprising a cyclic guanidine. It will be understood that "guanidine" refers to a compound, moiety, and/or residue having the following general structure:

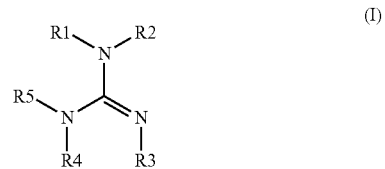

wherein each of R1, R2, R3, R4, R5 (i.e., substituents of structure (I)) can comprise hydrogen, (cyclo)alkyl, aryl, aromatic, organometallic, a polymeric structure, or together can form a cycloalkyl, aryl, or an aromatic structure, and wherein R1, R2, R3, R4, and R5 can be the same or different. As used herein, "(cyclo)alkyl" refers to both alkyl and cycloalkyl. When any of the R groups "together can form a (clyco)alkyl, aryl, and/or aromatic group" it is meant that any two adjacent R groups are connected to form a cyclic moiety, such as the rings in structures (II)-(V) below.

It will be appreciated that in some embodiments, the double bond between the carbon atom and the nitrogen atom that is depicted in structure (I) may be located between the carbon atom and another nitrogen atom of structure (I). Accordingly, the various substituents of structure (I) may be attached to different nitrogens depending on where the double bond is located within the structure.

In certain embodiments, the cyclic guanidine comprises the guanidine of structure (I) wherein two or more R groups of structure (I) together form one or more rings. In other words, in some embodiments the cyclic guanidine comprises ≥1 ring. For example, the cyclic guanidine can either be a monocyclic guanidine (1 ring) as depicted in structures (II) and/or (III) below, or the cyclic guanidine can be polycyclic (≥2 rings) as depicted in structures (IV) and (V) below.

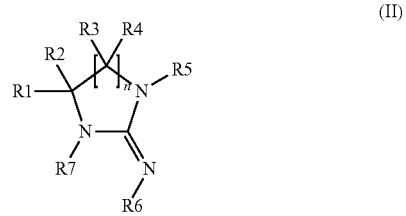

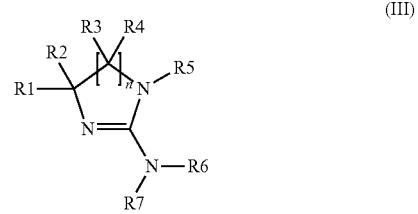

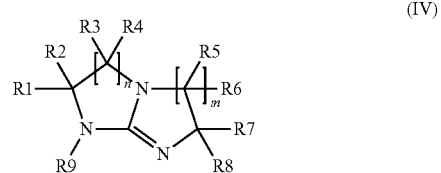

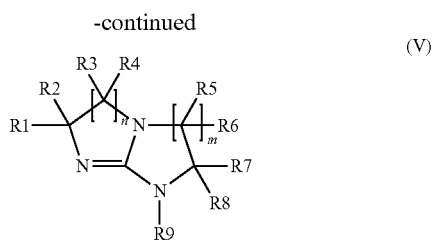

(V)

Each substituent of structures (II) and/or (III), R1-R7, can comprise hydrogen, (cyclo)alkyl, aryl, aromatic, organometallic, a polymeric structure, or together can form a cycloalkyl, aryl, or an aromatic structure, and wherein R1-R7 can be the same or different. Similarly, each substituent of structures (IV) and (V), R1-R9, can be hydrogen, alkyl, aryl, aromatic, organometallic, a polymeric structure, or together can form a cycloalkyl, aryl, or an aromatic structure, and wherein R1-R9 can be the same or different. Moreover, in some embodiments of structures (II) and/or (III), certain combinations of R1-R7 may be part of the same ring structure. For example, R1 and R7 of structure (II) may form part of a single ring structure. Moreover, in some embodiments, it will be understood that any combination of substituents (R1-R7 of structures (II) and/or (III) as well as R1-R9 of structures (IV) and/or (V)) can be chosen so long as the substituents do not substantially interfere with the catalytic activity of the cyclic guanidine.

In certain embodiments, each ring in the cyclic guanidine is comprised of ≥5-members. For instance, the cyclic guanidine may be a 5-member ring, a 6-member ring, or a 7-member ring. As used herein, the term "member" refers to an atom located in a ring structure. Accordingly, a 5-member ring will have 5 atoms in the ring structure ("n" and/or "m"=1 in structures (II)-(V)), a 6-member ring will have 6 atoms in the ring structure ("n" and/or "m"=2 in structures (II)-(V)), and a 7-member ring will have 7 atoms in the ring structure ("n" and/or "m"=3 in structures (II)-(V)). It will be appreciated that if the cyclic guanidine is comprised of ≥2 rings (e.g., structures (IV) and (V)), the number of members in each ring of the cyclic guanidine can either be the same or different. For example, one ring may be a five-member ring while the other ring may be a six-member ring. If the cyclic guanidine is comprised of ≥3 rings, then in addition to the combinations cited in the preceding sentence, the number of members in a first ring of the cyclic guanidine can be different from the number of members in any other ring of the cyclic guanidine.

It will also be understood that in certain embodiments of the cyclic guanidine the nitrogen atoms of structures (II)-(V) can further have additional atoms attached thereto. Moreover, in some embodiments, the cyclic guanidine can either be substituted or unsubstituted. For example, as used herein in conjunction with the cyclic guanidine, "substituted", in certain embodiments, refers to a cyclic guanidine wherein R5, R6, and/or R7 of structures (II) and/or (III) and/or R9 of structures (IV) and/or (V) is not hydrogen. As used herein in conjunction with the cyclic guanidine, "unsubstituted", in certain embodiments, refers to a cyclic guanidine wherein R1-R7 of structures (II) and/or (III) and/or R1-R9 of structures (IV) and/or (V) is hydrogen. In some embodiments, the substituted cyclic guanidine is 1,5,7-triazabicyclo[4.4.0]dec-5-ene.

It has been surprisingly discovered that the cyclic guanidine is itself a catalyst (e.g., a curing catalyst) for the electrodepositable coating composition. Accordingly, introduction of a cyclic guanidine into an electrodepositable coating composition can reduce and/or eliminate the use of metal catalysts, such as tin and/or bismuth, in an electrodepositable coating composition.

In some embodiments, the cyclic guanidine of the present invention is used in combination with a metal, such as a metal ion, which can be added to the electrodepositable coating composition. Metals that can be used in combination with the cyclic guanidine include, without limitation, bismuth, tin, zinc, zirconium, titanium, manganese, tungsten, yttrium, molybdenum, lanthanum, cobalt, cerium, magnesium, or combinations thereof. It is noted that the oxides and/or salts of the metals recited in the preceding sentence as well as an organo functionalized material comprising one of the metals may also be utilized in the present invention. Moreover, it will be appreciated that some of the metal species are themselves catalysts and, therefore, act as a co-catalyst with the cyclic guanidine. Therefore, the amount of metal catalyst in an electrodepositable coating composition can be reduced by using the cyclic guanidine in combination with a metal.

In some embodiments, the electrodepositable coating composition comprises ≥0.01% or ≥0.2% by weight of the cyclic guanidine, based on the total weight of the resin solids of the electrodepositable coating composition. In other embodiments, the electrodepositable coating composition comprises ≤7% or ≤4% or ≤2 by weight of the cyclic guanidine, based on the total weight of the resin solids of the electrodepositable coating composition. In certain embodiments, the amount of cyclic guanidine present in the electrodepositable coating composition can range between any combination of values, which were recited in the preceding sentences, inclusive of the recited values. For example, in certain embodiments, the electrodepositable coating composition comprises 0.6% to 2.0% by weight of the cyclic guanidine, based on the total weight of the resin solids of the electrodepositable coating composition.

As will be discussed in greater detail below, the cyclic guanidine that is described in the preceding paragraphs can be incorporated into the electrodepositable coating composition using a variety of means. For example, the cyclic guanidine can be: (i) added as an additive to the an electrodepositable coating composition; (ii) incorporated into the main film-forming polymer of an electrodepositable coating composition; (iii) incorporated into the water dispersible polymer of a grind vehicle component of an electrodepositable coating composition; (iv) used to block a curing agent in an electrodepositable coating composition, (v) incorporated into a portion of a crater control additive, (vi) incorporated into a microgel, and/or (vii) used in any combination thereof.

Electrodeposition baths are typically supplied as two components: (i) a main vehicle and (ii) a grind vehicle. The first component (main vehicle) can be an unpigmented resin feed which generally comprises a resin blend. In certain embodiments, the resin blend comprises (a) a main film-forming polymer (e.g., an active hydrogen-containing ionic salt group-containing resin) having reactive functional groups, (b) a curing agent that is reactive with functional groups on the film-forming polymer, and (c) any additional water-dispersible non-pigmented components. Wide varieties of main film-forming polymers are known and can be used in the electrodeposition baths of the invention so long as the polymers are "water dispersible." As used herein, "water dispersible" will mean that a material is adapted to be solubilized, dispersed, and/or emulsified in water. The main film-forming polymers used in the invention are ionic in nature. Accordingly, in some embodiments, the main film-forming polymer is cationic. In other words, the main film-forming polymer comprises cationic salt groups, generally prepared by neutralizing a functional group on the film-forming polymer with an acid, which enables the main film-forming polymer to be electrodeposited onto a cathode.

Examples of main film-forming polymers suitable for use in cationic electrocoating coating compositions include, without limitation, cationic polymers derived from a polyepoxide, an acrylic, a polyurethane, and/or polyester, hydroxyl group-containing polymers, amine salt group-containing polymers, or combinations thereof. It should be noted that in some embodiments, that main film-forming polymer is a copolymers of the polymers listed in the preceding sentence.

Accordingly, in some embodiments, the main film-forming polymer is a cationic polymer (cationic resin) that is derived from a polyepoxide. For example, the main film-forming polymer can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. As will be discussed in greater detail below, the reaction product can then be reacted with a cationic salt group former to produce the cationic polymer.

In certain embodiments, a chain extended polyepoxide typically is prepared as follows: the polyepoxide and polyhydroxyl group-containing material are reacted together "neat" or in the presence of an inert organic solvent such as a ketone, including methyl isobutyl ketone and methyl amyl ketone, aromatics such as toluene and xylene, and glycol ethers such as the dimethyl ether of diethylene glycol. The reaction typically is conducted at a temperature of 80° C. to 160° C. for 30 to 180 minutes until an epoxy group-containing resinous reaction product is obtained.

In some embodiments, the equivalent ratio of reactants (i.e., epoxy:polyhydroxyl group-containing material) ranges from 1.00:0.50 to 1.00:2.00.

In certain embodiments, the polyepoxide typically has at least two 1,2-epoxy groups. The epoxy compounds may be saturated or unsaturated, cyclic or acyclic, aliphatic, alicyclic, aromatic or heterocyclic. Moreover, the epoxy compounds may contain substituents such as halogen, hydroxyl, and ether groups.

Examples of polyepoxides are those having a 1,2-epoxy equivalency greater than one and/or two; that is, polyepoxides which have on average two epoxide groups per molecule. Suitable polyepoxides include polyglycidyl ethers of polyhydric alcohols such as cyclic polyols and polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as hydrogenated bisphenol A, 1,2-cyclohexane diol and 1,2-bis(hydroxymethyl)cyclohexane.

In certain embodiments, the polyepoxides have epoxide equivalent weights ≥180. In some embodiments, the polyepoxides have epoxide equivalent weights ≤2000. In other embodiments, the polyepoxides have epoxide equivalent weights that range between any combination of values, which were recited in the preceding sentences, inclusive of the recited values. For example, in certain embodiments the polyepoxides have epoxide equivalent weights ranges from 186 to 1200.

Epoxy group-containing acrylic polymers may also be used in the present invention. In certain embodiments, epoxy group-containing acrylic polymers have an epoxy equivalent weight ≥750. In other embodiments, epoxy group-containing acrylic polymer has an epoxy equivalent weight of ≤2000. In some embodiments, the epoxy group-containing acrylic polymer has an epoxy equivalent weight that ranges between any combination of values, which were recited in the preceding sentences, inclusive of the recited values.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used.

The main film-forming polymer can contain cationic salt groups, which can be incorporated into the resin molecule as follows: The resinous reaction product prepared as described above is further reacted with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines, hydroxyl-containing amines, polyamines, or combinations thereof may be used.

Tertiary and secondary amines are used more often than primary amines because primary amines are polyfunctional with respect to epoxy groups and have a greater tendency to gel the reaction mixture. If polyamines or primary amines are used, they can be used in a substantial stoichiometric excess to the epoxy functionality in the polyepoxide so as to prevent gelation and the excess amine can be removed from the reaction mixture by vacuum stripping or other technique at the end of the reaction. The epoxy may be added to the amine to ensure excess amine.

Examples of hydroxyl-containing amines include, but are not limited to, alkanolamines, dialkanolamines, alkyl alkanolamines, and aralkyl alkanolamines containing from 1 to 18 carbon atoms, such as 1 to 6 carbon atoms, in each of the alkanol, alkyl and aryl groups. Specific examples include ethanolamine, N-methylethanolamine, diethanolamine, N-phenylethanolamine, N,N-dimethylethanolamine, N-methyldiethanolamine, 3-aminopropyldiethanolamine, and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine, 3-dimethylaminopropylamine, and N,N-dimethylcyclohexylamine.

Mixtures of the above mentioned amines may also be used in the present invention.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature ranging from 50° C. to 150° C. may be done to hasten the reaction.

The reaction product of the primary and/or secondary amine and the polyepoxide is made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

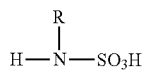

wherein R is hydrogen or an alkyl group having 1 to 4 carbon atoms.

It is noted that mixtures of the above mentioned acids may also be used may be used in the present invention.

The extent of neutralization of the cationic electrodepositable coating composition varies with the particular reaction product involved. However, sufficient acid should be used to disperse the electrodepositable coating composition in water. Typically, the amount of acid used provides at least 20 percent of all of the total neutralization. Excess acid may also be used beyond the amount required for 100 percent total neutralization. For example, in some embodiments, the amount of acid used to neutralize the electrodepositable coating composition is ≥1% based on the total amines in the electrodepositable coating composition. In other embodiments, the amount of acid used to neutralize the electrodepositable coating composition is ≤100% based on the total amines in the electrodepositable coating composition. In certain embodiments, the total amount of acid used to neutralize the electrodepositable coating composition ranges between any combination of values, which were recited in the preceding sentences, inclusive of the recited values. For example, the total amount of acid used to neutralize the electrodepositable coating composition can be 20%, 35%, 50%, 60%, or 80% based on the total amines in the electrodepositable coating composition.

In the reaction of a tertiary amine with a polyepoxide, the tertiary amine can be pre-reacted with the neutralizing acid to form the amine salt and then the amine salt reacted with the polyepoxide to form a quaternary salt group-containing resin. The reaction is conducted by mixing the amine salt with the polyepoxide in water. Typically, the water is present in an amount ranging from 1.75% to 20% by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of 100° C. (at atmospheric pressure). At higher pressures, higher reaction temperatures may be used.

In some embodiments, the reaction temperature ranges from 60° C. to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water. In an embodiment of the present invention, at least a portion of the active hydrogens present in the resin (a) comprise primary amine groups derived from the reaction of a ketimine-containing compound and an epoxy group-containing material such as those described above.

In addition to resins containing amine salts and quaternary ammonium salt groups, cationic polymers containing ternary sulfonium groups may be used in the composition of the present invention. Examples of these resins and their method of preparation are described in U.S. Pat. Nos. 3,793,278 and 3,959,106.

Suitable active hydrogen-containing, cationic salt group-containing resins can include copolymers of one or more alkyl esters of acrylic acid or (meth)acrylic acid optionally together with one or more other polymerizable ethylenically unsaturated monomers. Suitable alkyl esters of acrylic acid or (meth)acrylic acid include methyl (meth)acrylate, ethyl (meth)acrylate, butyl (meth)acrylate, ethyl acrylate, butyl acrylate, and 2-ethyl hexyl acrylate. Suitable other copolymerizable ethylenically unsaturated monomers include nitriles such acrylonitrile and (meth)acrylonitrile, vinyl and vinylidene halides such as vinyl chloride and vinylidene fluoride and vinyl esters such as vinyl acetate. Acid and anhydride functional ethylenically unsaturated monomers such as acrylic acid, (meth)acrylic acid or anhydride, itaconic acid, maleic acid or anhydride, or fumaric acid may be used. Amide functional monomers including acrylamide, (meth)acrylamide, and N-alkyl substituted (meth)acrylamides are also suitable. Vinyl aromatic compounds such as styrene and vinyl toluene can be used so long as a high level of photodegradation resistance of the polymer is not required.

Functional groups such as hydroxyl and amino groups can be incorporated into the acrylic polymer by using functional monomers such as hydroxyalkyl acrylates and methacrylates or aminoalkyl acrylates and methacrylates. Epoxide functional groups (for conversion to cationic salt groups) may be incorporated into the acrylic polymer by using functional monomers such as glycidyl acrylate and methacrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the acrylic polymer by reacting carboxyl groups on the acrylic polymer with an epihalohydrin or dihalohydrin such as epichlorohydrin or dichlorohydrin.

The acrylic polymer can be prepared by traditional free radical initiated polymerization techniques, such as solution or emulsion polymerization, as known in the art, using suitable catalysts which include organic peroxides and azo type compounds and optionally chain transfer agents such as alpha-methyl styrene dimer and tertiary dodecyl mercaptan. Additional acrylic polymers which are suitable for forming the active hydrogen-containing, cationic polymer and which can be used in the electrodepositable coating compositions of the present invention include those resins described in U.S. Pat. Nos. 3,455,806 and 3,928,157.

As stated above, the main film-forming polymer can also be derived form a polyurethane. Among the polyurethanes which can be used are polymeric polyols which are prepared by reacting polyester polyols or acrylic polyols such as those mentioned above with a polyisocyanate such that the OH/NCO equivalent ratio is greater than 1:1 so that free hydroxyl groups are present in the product. Smaller polyhydric alcohols such as those disclosed above for use in the preparation of the polyester may also be used in place of or in combination with the polymeric polyols.

Additional examples of polyurethane polymers suitable for forming the active hydrogen-containing, cationic polymer include the polyurethane, polyurea, and poly(urethane-urea) polymers prepared by reacting polyether polyols and/or polyether polyamines with polyisocyanates. Such polyurethane polymers are described in U.S. Pat. No. 6,248,225.

Epoxide functional groups may be incorporated into the polyurethane by methods well known in the art. For example, epoxide groups can be incorporated by reacting glycidol with free isocyanate groups.

Sulfonium group-containing polyurethanes can also be made by at least partial reaction of hydroxy-functional sulfide compounds, such as thiodiglycol and thiodipropanol, which results in incorporation of sulfur into the backbone of the polymer. The sulfur-containing polymer is then reacted with a monofunctional epoxy compound in the presence of acid to form the sulfonium group. Appropriate monofunctional epoxy compounds include ethylene oxide, propylene oxide, glycidol, phenylglycidyl ether, and CARDURA E, available from Resolution Performance Products.

In addition to being derived from a polyepoxide or a polyurethane, the main film-forming polymer can also be derived from a polyester. Such polyesters can be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol. Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Moreover, hydroxy acids and/or lactones, such as caprolactone and/or 12-hydroxystearic acid, may also be used as components of the polyester.

The polyesters contain a portion of free hydroxyl groups (resulting from the use of excess polyhydric alcohol and/or higher polyols during preparation of the polyester) which are available for cure reactions.

Epoxide functional groups may be incorporated into the polyester by reacting carboxyl groups on the polyester with an epihalohydrin or dihalohydrin such as epichlorohydrin or dichlorohydrin. Alternatively, in some embodiments, an acid functional polyester can be incorporated into an epoxy polymer by reaction of carboxyl groups with an excess of polyepoxide.

Sulfonium salt groups can be introduced by the reaction of an epoxy group-containing polymer of the types described above with a sulfide in the presence of an acid, as described in U.S. Pat. Nos. 3,959,106 and 4,715,898. Sulfonium groups can be introduced onto the polyester backbones described using similar reaction conditions.

In some embodiments, the main film-forming polymer further comprises cationic amine salt groups which are derived from pendant and/or terminal amino groups. By "terminal and/or pendant" is meant that primary and/or secondary amino groups are present as a substituent which is pendant from or in the terminal position of the polymeric backbone, or, alternatively, is an end-group substituent of a group which is pendant and/or terminal from the polymer backbone. In other words, the amino groups from which the cationic amine salt groups are derived are not required to be within the polymeric backbone. The pendant and/or terminal amino groups can have the following structures (I) or (II):

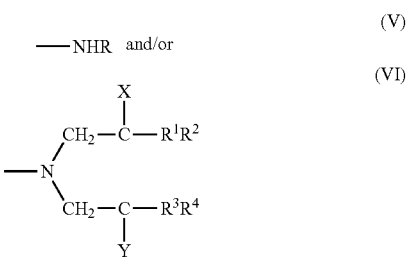

wherein R represents H or $C_1$ to $C_{18}$ alkyl; $R^1$, $R^2$, $R^3$, and $R^4$ are the same or different, and each independently represents H or $C_1$ to $C_4$ alkyl; and X and Y can be the same or different, and each independently represents a hydroxyl group and/or an amino group.

As used in conjunction with structures (V) and (VI), "alkyl" is meant alkyl and aralkyl, cyclic or acyclic, linear or branched monovalent hydrocarbon groups. The alkyl groups can be unsubstituted or substituted with one or more heteroatoms, for example, non-carbon, non-hydrogen atoms such as one or more oxygen, nitrogen or sulfur atoms.

The pendant and/or terminal amino groups represented by structures (V) and (VI) above can be derived from a compound selected from the group consisting of ammonia, methylamine, diethanolamine, diisopropanolamine, N-hydroxyethyl ethylenediamine, diethylenetriamine, and mixtures thereof. One or more of these compounds is reacted with one or more of the above described polymers, for example, a polyepoxide polymer, where the epoxy groups are ring-opened via reaction with a polyamine, thereby providing terminal amino groups and secondary hydroxyl groups.

In some embodiments, the terminal amino groups has structure (VI) wherein both X and Y comprise primary amino groups (e.g., the amino group is derived from diethylenetriamine). It should be understood that in this instance, prior to reaction with the polymer, the primary amino groups can be blocked, for example, by reaction with a ketone such as methyl isobutyl ketone, to form the diketimine. Such ketimines are those described in U.S. Pat. No. 4,104,147, column 6, line 23 to column 7, line 23. The ketimine groups can decompose upon dispersing the amine-epoxy reaction product in water, thereby providing free primary amine groups as curing reaction sites.

In certain embodiments, the amines from which the pendant and/or terminal amino groups are derived comprise primary and/or secondary amine groups such that the active hydrogens of said amines will be consumed by reaction with the at least partially blocked aliphatic polyisocyanate curing agent to form urea groups or linkages during the curing reaction.

It should be understood that, in some embodiments, the active hydrogens associated with the main film-forming polymer include any active hydrogens which are reactive with isocyanates at temperatures sufficient to cure the electrodepositable coating composition as previously discussed (i.e., at temperatures at or below 182.2° C. (360° F.)). The active hydrogens typically are derived from reactive hydroxyl groups, and primary and secondary amino, including mixed groups such as hydroxyl and primary amino. In some embodiments of the present invention, at least a portion of the active hydrogens are derived from hydroxyl groups comprising phenolic hydroxyl groups. In some embodiments, the main film-forming polymer has an active hydrogen content of ≥1 milliequivalents of active hydrogen per gram of resin solids. In other embodiments, the main film-forming polymer has an active hydrogen content of ≤4 milliequivalents of active hydrogen per gram of resin solids. In certain embodiments, the main film-forming polymer has an active hydrogen content ranging between any combination of values, which were recited in the preceding sentences, inclusive of the recited values. For example, in some embodiments, the main film-forming polymer has an active hydrogen content ranging from 2 to 3 milliequivalents of active hydrogen per gram of resin solids.

The extent of cationic salt group formation should be such that when the resin is mixed with an aqueous medium and other ingredients, a stable dispersion of the electrodepositable coating composition will form. By "stable dispersion" is meant one that does not settle or is easily redispersible if some settling occurs. Moreover, the dispersion should be of sufficient cationic character that the dispersed resin particles will electrodeposite on a cathode when an electrical potential is set up between an anode and a cathode immersed in the aqueous dispersion.

In certain embodiments, the main film-forming polymer in the electrodepositable coating composition of the present invention comprises ≥0.1 milliequivalents of cationic salt group per gram of resin solids. In other embodiments, the main film-forming polymer comprises ≤3.0 milliequivalents of cationic salt group per gram of resin solids. In some embodiments, the milliequivalents of cationic salt group per gram of resin solids in the main film-forming polymer ranges between any combination of values, which were recited in the preceding sentences, inclusive of the recited values. For example, in some embodiments, the electrodepositable coating composition comprises from 0.1 to 0.7 milliequivalents of cationic salt group per gram of resin solids.

Moreover, in some embodiments, the main film-forming polymer typically is non-gelled, having a number average molecular weight ≥2000. In other embodiments, the main film-forming polymer is non-gelled and has a number average molecular weight of ≤15,000. In certain embodiments, the average molecular weight of the main film-forming polymer ranges between any combination of values, which were recited in the preceding sentences, inclusive of the recited values. For example, in some embodiments, the average molecular weight of the main film-forming polymer ranges from 5000 to 10,000. As used herein, "non-gelled" means a polymer that is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

In certain embodiments, the main film-forming polymer is present in the electrodepositable coating composition in an amount ≥40% by weight based on weight of total resin solids present in the electrodepositable coating composition. In other embodiments, the main film-forming polymer is present in the electrodepositable coating composition in an amount ≤95% by weight based on weight of total resin solids present in the electrodepositable coating composition. In some embodiments, the weight percent of the main film-forming polymer in the electrodepositable coating composition ranges between any combination of values, which were recited in the preceding sentences, inclusive of the recited values. For example, the main film-forming polymer is present in the electrodepositable coating composition in an amount ranging from 50% to 75% by weight based on weight of total resin solids present in the electrodepositable coating composition.

In some embodiments, the main film-forming polymers can be selected from cationic acrylic polymers such as those described in U.S. Pat. Nos. 3,455,806 and 3,928,157. In some embodiments, the main film-forming polymer can be selected from the polymers described in U.S. Pat. Nos. 6,165,338 and 4,543,376, which are incorporated herein by reference. In certain embodiments, the main film-forming polymers can be selected from hydroxy group-containing polymers including, without limitation, the reaction products of: (i) bisphenol A and ethylene oxide, (ii) bisphenol A and propylene oxide, (iii) bisphenol A and polyethylene oxide and/or polypropylene oxide diamines, and/or (iv) bisphenol A and bisphenol A diglycidyl ether. In other embodiments, the main film-forming polymers can be amine salt group-containing polymers including, without limitation, the acid-solubilized reaction products of polyepoxides and primary or secondary amines such as those described in U.S. Pat. Nos. 3,663,389; 3,984,299; 3,947,338; 3,947,339; and 4,116,900. Suitable primary or secondary amines include, without limitation, methyl ethanol amine, diethanolamine, diethylene triamine diketimine, diethyl amine, dimethyl amine, other di alkyl amines, amino propyl diethanols amine, or combinations thereof. Usually, these amine salt group-containing polymers are used in combination with a blocked isocyanate curing agent. The isocyanate can be fully blocked as described in the aforementioned U.S. Pat. No. 3,984,299 or the isocyanate can be partially blocked and reacted with the polymer backbone such as described in U.S. Pat. No. 3,947,338. Also, one-component compositions as described in U.S. Pat. No. 4,134,866 and DE-OS No. 2,707,405 can be used as the film-forming resin.

Besides amine salt group-containing polymers, quaternary ammonium salt group-containing polymers can also be employed. Examples of these polymers are those which are formed by reacting an organic polyepoxide with a tertiary amine salt. Such polymers are described in U.S. Pat. Nos. 3,962,165; 3,975,346; and 4,001,101. Examples of other cationic polymers are ternary sulfonium salt group-containing polymers and quaternary phosphonium salt-group containing polymers such as those described in U.S. Pat. Nos. 3,793,278 and 3,984,922, respectively. Also, film-forming polymers which cure via transesterification such as described in European Application No. 12463 can be used. Further, cationic compositions prepared from Mannich bases such as described in U.S. Pat. No. 4,134,932 can be used.

As stated above, in addition to the (a) main film-forming polymer, the resin blend further comprises (b) a curing agent (crosslinker) that is reactive with reactive functional groups, such as active hydrogen groups, on the main film-forming polymer. The curing agents that may be used with the present invention include, but is not limited to, urethane, isocyanate, ester, or combinations thereof.

It will be understood that non-limiting examples of urethane curing agents include the products of (i) an amine-carbonate reaction and/or (ii) an isocyanate-alcohol reaction.

Non-limiting examples of suitable cyclic carbonates that can be utilized to form the urethane curing agent, include, without limitation, propylene carbonate, ethylene carbonate, butylene carbonate, or combinations thereof. Non-limiting examples of suitable acyclic carbonates that can be utilized to form the urethane, include, without limitation, dimethyl carbonate, diethyl carbonate, methylethyl carbonate, dipropyl carbonate, methylpropyl carbonate, dibutyl carbonate, or combinations thereof. In some embodiments of the present invention, the acyclic carbonate comprises dimethyl carbonate. Non-limiting examples of suitable amines that can be utilized to form the urethane, include, without limitation, diethylene triamine, dipropylene triamine, bis-hexamethylene triamine, isophorone diamine, 4'-bis-aminocyclohexylamine, xylylene diamine, N-hydroxyethyl ethylene diamine, hexamethylene triamine, trisaminoethylamine, or combinations thereof. In some embodiments, the curing agent is a reaction product of a polyamine and a cyclic carbonate. It will be understood that in certain embodiments, the primary amines of the polyamine are reacted with the cyclic carbonate. In some embodiments of the present invention, the reaction product of the polyamine and the cyclic carbonate can then be reacted with an epoxy functional polymer such as those used to prepare the main vehicle and/or grind vehicle. Specifically, in some embodiments, the secondary amine of the reaction product is reacted with the epoxy functional group of the epoxy functional polymer.

Non-limiting examples of suitable isocyanates that can be utilized to form the urethane curing agent include, without limitation, toluene diisocyanate, methylene diphenyl 4,4'-diisocyanate, isophorone diisocyanate, hexamethylene diisocyanate, xylyleuediisocyanate, tetramethylxylylene diisocyanate, straight chain aliphatic diisocyanates such as 1,4-tetramethylene diisocyanate, norbornane diisocyanate, and 1,6-hexamethylene diisocyanate, isophorone diisocyanate and 4,4'-methylene-bis-(cyclohexyl isocyanate), aromatic diisocyanates such as p-phenylene diisocyanate, diphenylmethane-4,4'-diisocyanate and 2,4- or 2,6-toluene diisocyanate, higher polyisocyanates such as triphenylmethane-4,4',4"-triisocyanate, 1,2,4-benzene triisocyanate and polymethylene polyphenyl isocyanate, and trimers of 1,6-hexamethylene diisocyanate, or combinations thereof. It should be noted that the dimers, trimers and higher functional materials of these isocyanates may also be utilized in the present invention. Non-limiting examples of suitable alcohols that can be utilized to form the urethane include, without limitation, methanol, ethanol, propanol, isopropanol, butanol, glycol ethers, and other alcohols.

As stated above, suitable curing agents for amine salt group-containing polymers, cationic acrylic polymers, and/or hydroxy group-containing polymers include isocyanates as well as blocked isocyanates. It should be noted that as used herein, "isocyanates" also includes polyisocyanates and vice versa. The polyisocyanate curing agent may be a fully blocked polyisocyanate with substantially no free isocyanate groups, or it may be partially blocked and reacted with the resin backbone as described in U.S. Pat. No. 3,984,299. The polyisocyanate can be an aliphatic, an aromatic polyisocyanate, or combinations thereof. In some embodiments, diisocyanates are utilized, although in other embodiments higher polyisocyanates can be used in place of or in combination with diisocyanates.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate can be used.

Any suitable alcohol or polyol can be used as a blocking agent for the polyisocyanate in the electrodepositable coating composition of the present invention provided that the agent will deblock at the curing temperature and provided a gelled product is not formed. For example, suitable alcohols include, without limitation, methanol, ethanol, propanol, isopropyl alcohol, butanol, 2-ethylhexanol, butoxyethanol, hexyloxyethanol, 2-ethylhexyloxyethanol, n-butanol, cyclohexanol phenyl carbinol, methylphenyl carbinol, ethylene glycol monobutyl ether, diethylene glycol monobutylether, ethylene glycol monomethylether, propylene glycol monomethylether, or combinations thereof.

In certain embodiments of the present invention, the blocking agent comprises one or more 1,3-glycols and/or 1,2-glycols. In one embodiment of the present invention, the blocking agent comprises one or more 1,2-glycols, typically one or more $C_3$ to $C_6$,2-glycols. For example, the blocking agent can be selected from at least one of 1,2-propanediol, 1,3-butanediol, 1,2-butanediol, 1,2-pentanediol, timethylpentene diol, and/or 1,2-hexanediol.

Other suitable blocking agents include oximes such as methyl ethyl ketoxime, acetone oxime and cyclohexanone oxime and lactams such as epsilon-caprolactam.

As stated above, in some embodiments, the curing agent that is used in the present invention is an ester curing agent. It should be noted that as used herein, "ester" also includes polyesters. Accordingly, in some embodiments, a polyester curing agent. Suitable polyester curing agents include materials having greater than one ester group per molecule. The ester groups are present in an amount sufficient to effect cross-linking, for example at temperatures up to 250° C., and curing times of up to 90 minutes. It should be understood that acceptable cure temperatures and cure times will be dependent upon the substrates to be coated and their end uses.

Compounds generally suitable as the polyester curing agent are polyesters of polycarboxylic acids. Non-limiting examples include bis(2-hydroxyalkyl)esters of dicarboxylic acids, such as bis(2-hydroxybutyl) azelate and bis(2-hydroxyethyl)terephthalate; tri(2-ethylhexanoyl)trimellitate; and poly(2-hydroxyalkyl)esters of acidic half-esters prepared from a dicarboxylic acid anhydride and an alcohol, including polyhydric alcohols. The latter type is suitable to provide a polyester with a final functionality of more than 2. One suitable example includes a polyester prepared by first reacting equivalent amounts of the dicarboxylic acid anhydride (e.g., succinic anhydride or phthalic anhydride) with a trihydric or tetrahydric alcohol, such as glycerol, trimethylolpropane or pentaerythritol, at temperatures below 150° C., and then reacting the acidic polyester with at least an equivalent amount of an epoxy alkane, such as 1,2-epoxy butane, ethylene oxide, or propylene oxide. The polyester curing agent (ii) can comprise an anhydride. Another suitable polyester comprises a lower 2-hydroxy-alkylterminated poly-alkyleneglycol terephthalate.

In some embodiments, the polyester comprises at least one ester group per molecule in which the carbon atom adjacent to the esterified hydroxyl has a free hydroxyl group.

Also suitable is the tetrafunctional polyester prepared from the half-ester intermediate prepared by reacting trimellitic anhydride and propylene glycol (molar ratio 2:1), then reacting the intermediate with 1,2-epoxy butane and the glycidyl ester of branched monocarboxylic acids.

In some embodiments, where the active hydrogen-containing resin comprises cationic salt groups, the polyester curing agent is substantially free of acid. For purposes of the present invention, by "substantially free of acid" is meant having less than 0.2 meq/g acid. For aqueous systems, for example for cathodic electrocoating, coating compositions, suitable polyester curing agents can include non-acidic polyesters prepared from a polycarboxylic acid anhydride, one or more glycols, alcohols, glycol mono-ethers, polyols, and/or monoepoxides.

Suitable polycarboxylic anhydrides can include dicarboxylic acid anhydrides, such as succinic anhydride, phthalic anhydride, tetrahydrophthalic anhydride, trimellitic anhydride, hexahydrophthalic anhydride, methylhexahydrophthalic anhydride, 3,3',4,4'-benzophenonetetracarboxylic dianhydride, and pyromellitic dianhydride. Mixtures of anhydrides can be used.

Suitable alcohols can include linear, cyclic or branched alcohols. The alcohols may be aliphatic, aromatic or araliphatic in nature. As used herein, the terms glycols and mono-epoxides are intended to include compounds containing not more than two alcohol groups per molecule which can be reacted with carboxylic acid or anhydride functions below the temperature of 150° C.

Suitable mono-epoxides can include glycidyl esters of branched monocarboxylic acids. Further, alkylene oxides, such as ethylene oxide or propylene oxide may be used. Suitable glycols can include, for example ethylene glycol and polyethylene glycols, propylene glycol and polypropylene glycols, and 1,6-hexanediol. Mixtures of glycols may be used.

Non-acidic polyesters can be prepared, for example, by reacting, in one or more steps, trimellitic anhydride (TMA) with glycidyl esters of branched monocarboxylic acids in a molar ratio of 1:1.5 to 1:3, if desired with the aid of an esterification catalyst such as stannous octoate or benzyl dimethyl amine, at temperatures of 50-150° C. Additionally, trimellitic anhydride can be reacted with 3 molar equivalents of a monoalcohol such as 2-ethylhexanol.

Alternatively, trimellitic anhydride (1 mol) can be reacted first with a glycol or a glycol monoalkyl ether, such as ethylene glycol monobutyl ether in a molar ratio of 1:0.5 to 1:1, after which the product is allowed to react with 2 moles of glycidyl esters of branched monocarboxylic acids. Furthermore, the polycarboxylic acid anhydride i.e., those containing two or three carboxyl functions per molecule) or a mixture of polycarboxylic acid anhydrides can be reacted simultaneously with a glycol, such as 1,6-hexane diol and/or glycol mono-ether and monoepoxide, after which the product can be reacted with mono-epoxides, if desired. For aqueous compositions these non-acid polyesters can also be modified with polyamines such as diethylene triamine to form amide polyesters. Such "amine-modified" polyesters may be incorporated in the linear or branched amine adducts described above to form self-curing amine adduct esters.

The non-acidic polyesters of the types described above typically are soluble in organic solvents, and typically can be mixed readily with the main film forming resin described above.

Polyesters suitable for use in an aqueous system or mixtures of such materials disperse in water typically in the presence of resins comprising cationic salt groups.

In some embodiments, the polyisocyanate curing agents are typically utilized in conjunction with the cationic main film-forming polymers in amounts of ≥5% by weight based on the total weight of the resin solids of the electrodeposition bath. In other embodiments, the polyisocyanate curing agents are typically utilized in conjunction with the cationic main film-forming polymers in amounts of ≤60% by weight based on the total weight of the resin solids of the electrodeposition bath. In yet other embodiments, the amount of main film-forming polymer can range between any combination of values, which were recited in the preceding sentences, inclusive of the recited values. For example, the polyisocyanate curing agents can be utilized in conjunction with the cationic main film-forming polymers in an amount ranting from 20% to 50% by weight based on the total weight of the resin solids of the electrodeposition bath.

In some embodiments, the curing agent that can be used in the electrocoating composition is the curing agent that is described in U.S. Pat. No. 5,902,473, which is incorporated herein by reference.

It is understood that one skilled in the art can determine an appropriate curing agent for a particular main film-forming polymer based on the functionality of the main film-forming polymer.

In certain embodiments, at least a portion of the curing agent is chemically bound to the main film-forming polymer. In other embodiments, the curing agent is not chemically bound to the main film-forming polymer and is added as an additive to the electrodepositable coating composition.

The second component (grind vehicle) of an electrodeposition bath generally comprises a pigment composition (pigment paste), which can have one or more pigments, a water dispersible polymer, and, optionally, additives such as surfactants, wetting agents, catalysts, dispersing aids, or combinations thereof. It should be noted that the water dispersible polymer of the grind vehicle can either be the same or different from the main film-forming polymer in the resin blend. The pigment composition used in the grind vehicle may be of the conventional type comprising pigments of, for example, iron oxides, strontium chromate, carbon black, coal dust, titanium dioxide, talc, barium sulfate, as well as color pigments such as cadmium yellow, cadmium red, chromium yellow and the like. In some embodiments, the pigment composition can comprise effect pigments such as, but not limited to, electroconductive and/or photo chromic pigments. The pigment content of the dispersion is usually expressed as a pigment-to-resin ratio. In the practice of the invention, when pigment is employed, the pigment-to-resin ratio is usually within the range of about 0.02:1 to 1:1. The other additives mentioned above are usually in the dispersion in amounts of about 0.01% to 3% by weight based on weight of resin solids.

The first and second components of the electrodeposition bath are dispersed together in an aqueous medium which comprises water and, usually, coalescing solvents to form the electrodeposition bath. Useful coalescing solvents that can be used in the electrodeposition bath include, but are not limited to, hydrocarbons, alcohols, esters, ethers and/or ketones. In one embodiment, the coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. In certain embodiments, the amount of coalescing solvent used in the electrodeposition bath is ≥0.01% weight based on the total weight of the aqueous medium used to make the electrodeposition bath. In other embodiments, the amount of coalescing solvent used in the electrodeposition bath is ≤25% by weight based on the total weight of the aqueous medium used to make the electrodeposition bath. In yet other embodiments, the amount of coalescing solvent used in the electrodeposition bath can range between any combination of values, which were recited in the preceding sentences, inclusive of the recited values. For example, in one embodiment, the amount of coalescing solvent used in the electrodeposition bath can range from 0.05% to 5% by weight based on the total weight of the aqueous medium used to make the electrodeposition bath.

As stated above, in certain embodiments, the cyclic guanidine can be in the form of an additive that is added to an electrodepositable coating composition. In some embodiments, the additive is added "neat", that is, added directly into the electrodepositable coating composition without prior blending or reacting with the other components that comprise the electrodepositable coating composition. For example, in some embodiments, the additive is added "neat" into an electrodeposition bath and/or to components that are used to form the electrodeposition bath (e.g., resin blend and/or grind vehicle). In other embodiments, the additive is added to an aqueous medium prior to the aqueous medium being added to the electrodeposition bath. For instance, the additive can be added to an aqueous medium, which is added to the electrodeposition bath, after the electrodeposition bath has been prepared (i.e., post added). In some embodiments, the additive is added "neat" into the resin blend and/or into the grind vehicle before the resin blend and/or the grind vehicle is dispersed in an aqueous medium. In other words, the additive can be added to the resin blend and/or to the grind vehicle prior to the formation of the electrodeposition bath. The preparation of such an additive will be discussed in greater detail in the Examples section below.

In certain embodiments, the additive that is added to the electrodepositable coating composition comprises a reaction product of the cyclic guanidine and a monofunctional compound. Suitable monofunctional compounds include, without limitation, a mono-glycidyl compound such as phenol glycidyl ether, 2 ethylhexyl glycidyl ether, decanoic acid glycidyl ester, or combinations thereof.

Moreover, in some embodiments, the cyclic guanidine of the present invention is incorporated into the resin blend and/or the grind vehicle as part of an admixture that comprises the cyclic guanidine and an additional component. It will be appreciated that the cyclic guanidine as well as the additional component are both reactive with a functional group on the main film-forming polymer and/or the water dispersible polymer of the resin blend and/or grind vehicle, respectively. In some embodiments, the additional component is an "amine package" that is added to the resin blend and/or the grind vehicle. As used herein, "amine package" refers to an admixture of amines, such as, without limitation, polyamines, primary amines, secondary amines, amine-carbamates, tertiary amines, or combinations thereof.

In other embodiments, the additional component can include a sulfide or a combination of an amine package and a sulfide. Suitable sulfides that can be utilized in the present invention include, but are not limited to, hydroxy functional sulfides, such as thiodiethanol.

In certain embodiments, the additional component comprises other functional groups such as, without limitation, alcohols, tertiary amines, urethanes, ureas, ketimines, carbamates, or combinations thereof.

In some embodiments, the carbamate functional group is a reaction product of a polyamine and a carbonate, such as a cyclic carbonate. Suitable polyamines that can be utilized to form the carbamate include, without limitation, diethylene triamine, dipropylene triamine, bis-hexamethylene triamine, isophorone diamine, 4'-bis-aminocyclohexylamine, xylylene diamine, N-hydroxyethyl ethylene diamine, hexamethylene triamine, trisaminoethylamine, or combinations thereof. In certain embodiments, the polyamine comprises primary and/or secondary amines. Suitable carbonates that can be utilized to form the carbamate include, without limitation, ethylene carbonate, propylene carbonate, butylene carbonate, or mixtures thereof.

In some embodiments, the additional component comprises a reaction product of a polyamine and a carbonate. The polyamines and carbonates which are listed in the preceding paragraph are suitable for use in forming such a reaction product. In certain embodiments, the polyamine comprises a primary amine and a secondary amine. In some embodiments, at least a portion of the primary amine of the polyamine is reacted with a cyclic carbonate to form a carbamate.

In some embodiments, the cyclic guanidine is the only component of the admixture that reacts with the polymer of the resin blend and/or the grind vehicle.

As stated above, in certain embodiments, the cyclic guanidine can be incorporated into a polymer, such as the main film-forming polymer and/or the water dispersible polymer of the grind vehicle, of an electrodepositable coating composition. For clarity, the main film-forming polymer and the water dispersible polymer of the grind vehicle will generally be referred to as a "polymer." For example, the cyclic guanidine can be incorporated into a polymer via a reaction between the cyclic guanidine and a functional group on the polymer. In some embodiments, the cyclic guanidine is incorporated into an epoxy functional polymer by reacting with an epoxy functional group on the polymer. The preparation of a polymer incorporating the cyclic guanidine will be discussed in greater detail in the Examples section below.

In some embodiments of the present invention, the polymeric reaction product of the cyclic guanidine and a polymer may be rendered cationic and water dispersible by a variety of methods. For example, in some embodiments, the reaction product of a polymer and the cyclic guanidine is rendered cationic and water dispersible by neutralizing at least a portion of the cyclic guanidine moieties that are bonded to the polymer with an acid such as lactic acid, acetic acid, sulfamic formic acid, phosphoric acid, methanesulfonic acid, para toluenesulfonic acid, dimethylolpropionic acid, other acids, or combinations thereof. In some embodiments, the polymer is rendered cationic and water dispersible by neutralizing at least a portion of the amines that are bonded to the polymer with an acid (i.e., the cyclic guanidines are not neutralized). In yet other embodiments, the polymer is rendered cationic and water dispersible by neutralizing at least a portion of the cyclic guanidines and at least a portion of the amines, each of which are bonded to the polymer, with an acid.

As stated above, in certain embodiments of the invention, the curing agent that is utilized in the electrodepositable coating composition comprises the reaction product of the cyclic guanidine and an isocyanate. In some embodiments, isocyanate comprises aliphatic isocyanate, an aromatic isocyanate, or combinations thereof. One potential advantage of these embodiments is that the incorporation of the cyclic guanidine into the curing agent creates a blocked curing catalyst. In other words, upon the application of heat to the curing agent, the cyclic guanidine is released from the curing agent and is utilized to catalyze the curing process of the electrodepositable coating composition.

Moreover, in some embodiments, the cyclic guanidine is used to block at least a portion of the curing agent. Accordingly, it will be understood that once the curing agent is de-blocked (i.e., the cyclic guanidine is no longer blocking the curing agent), the curing agent is able to react with functional groups on the main film-forming polymer thereby curing the main film-forming polymer while the cyclic guanidine catalyzes the curing process.

As stated above, in certain embodiments, a crater control additive, which can incorporated into the electrodepositable coating composition, can comprise the cyclic guanidine. Suitable crater control additives include, without limitation, those described in U.S. Pat. Nos. 4,420,574, 4,423,166, and 4,423, 850, which are incorporated herein by reference. For example, in some embodiments, the cyclic guanidine can be used in lieu of at least a portion of the amines that are utilized to form a the crater control additive.

As stated above, in some embodiments, a microgel, which can be incorporated into the electrodepositable coating composition, can comprise the cyclic guanidine. A suitable microgel that can be utilized is described in U.S. Pat. No. 5,096,556, which is incorporated herein by reference. For example, in certain embodiments, the cyclic guanidine can be used in lieu of at least a portion of the amines that are utilized to form the microgel.

The electrodepositable coating composition of the present invention can be applied onto a number of substrates. Accordingly, the present invention is further directed to a substrate that is coated, at least in part, with the electrodepositable coating composition described herein. It will be understood that the electrocoating coating composition can be applied onto a substrate as a monocoat or as a coating layer in a multi-layer coating composite. Non-limiting examples of a suitable substrate can include a metal, a metal alloy, and/or a substrate that has been metallized such as nickel plated plastic. For example, the metal or metal alloy can include aluminum and/or steel. In one embodiment, the steel could be cold rolled steel, electrogalvanized steel, and hot dipped galvanized steel. In one embodiment, at least a portion of the surface of the metallic surface onto which the coating is applied is pretreated with phosphate, such as zinc phosphate. In certain embodiments, the coated substrate may comprise a portion of a vehicle such as a vehicular body (e.g., without limitation, door, body panel, trunk deck lid, roof panel, hood, and/or roof) and/or a vehicular frame. As used herein, the term "vehicle" or variations thereof includes, but is not limited to, civilian, commercial, and military land vehicles such as cars and trucks.

Moreover, the electrodepositable coating composition of the present invention may be applied onto the substrate to impart a wide variety of properties such as, but not limited to, corrosion resistance, chip resistance, filling (i.e., ability to hide underlying substrate roughness), abrasion resistance, impact damage, flame and/or heat resistance, chemical resistance, UV light resistance, and/or structural integrity.

Depending on the substrate, the electrodepositable coating composition is applied (i.e., electrodeposited) onto a substrate using a voltage that can range from 1 volt to several thousand volts. In one embodiment, the voltage that is used ranges from 50 volts to 500 volts. Moreover, in one embodiment, the current density is usually between 0.5 ampere and 5 amperes per square foot. It will be understood, however, that the current density tends to decrease during electrodeposition which is an indication of the formation of an insulating film.

After the coating has been applied onto the substrate via electrodeposition, in one embodiment, the coating is cured by baking the substrate at an elevated temperature ranging from 90° C. to 260° C. for a time period ranging from 1 minute to 40 minutes.

As stated above, in certain embodiments, the electrodepositable coating composition of the present invention is utilized in an electrocoating layer that is part of a multi-layer coating composite comprising a substrate with various coating layers. The coating layers could include a pretreatment layer, such as a phosphate layer (e.g., zinc phosphate layer), an electrocoating layer which results form the electrodepositable coating composition of the present invention, and suitable top coat layers (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The top coat typically includes a film-forming polymer, crosslinking material and, if a colored base coat or monocoat, one or more pigments. In one embodiment, the primer layer is disposed between the electrocoating layer and the base coat layer. In certain embodiments, one or more of the topcoat layers are applied onto a substantially uncured underlying layer. For example, in some embodiments, a clear coat layer is applied onto at least a portion of a substantially uncured basecoat layer (wet-on-wet), and both layers are simultaneously cured in a downstream process.

Moreover, in some embodiments, the top coat layers may be applied directly onto the electrodepositable coating layer. In other words, in some embodiments, the substrate lacks a primer layer. For example, in some embodiments, a basecoat layer is applied directly onto at least a portion of the electrodepositable coating layer.

It will also be understood that in certain embodiments, the top coat layers may be applied onto an underlying layer despite the fact that the underlying layer has not been fully cured. For example, a clearcoat layer may be applied onto a basecoat layer even though the basecoat layer has not been subjected to a curing step. Both layers can then be cured during a subsequent curing step thereby eliminating the need to cure the basecoat layer and the clearcoat layer separately.

In certain embodiments, additional ingredients such as colorants and fillers can be present in the various coating compositions from which the top coat layers result. Any suitable colorants and fillers may be used. For example, the colorant can be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

In some embodiments, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In other embodiments, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example 1

(a) An Undispersed Electrodepositable Resin

| | | |
|---|---|---|
| A | EPON 880[1] | 1103.88 |
| | Bisphenol A | 402.83 |
| | Methyl isobutyl ketone | 168.60 |
| B | Ethyltriphenyl phosphonium iodide | 1.45 |
| C | Crosslinker[2] | 961.62 |
| D | Diethanol amine | 18.94 |
| E | Diketimine[3] | 97.64 |
| F | Butylcarbitol formal | 294.91 |
| | Methyl isobutyl ketone | 92.34 |
| G | Epoxy additive[4] | 790.10 |

[1]Epoxy resin available from Hexion Specialty Chemicals
[2]Crosslinker prepared from the reaction of Hexamethylene triamine and propylene carbonate in 70% solids in MIBK
[3]MIBK diketimine of diethylene triamine at 72.7% in MIBK
[4]Epoxy additive was prepared by reacting EPON 880 with BPA to EEW of 935 and aminating with diethanol amine and ketimine.

Procedure: All weights are in grams. Items A and B are charged to a 4 neck round bottom flask, fit with a stirrer, temperature measuring probe, $N_2$ blanket and heated to 130° C. The mixture exotherms. Begin 1 hour hold at 145° C. The peak exotherm was 146° C. and the temperature allowed to drop to 145° C. After 1 hour, the reaction was cooled to 110° C. and charge C, D and E were added. The mixture was held at 115° C. for two hours. Charge F then was added and the mixture held for 30 minutes. Charge G then was added and the mixture held for an additional 30 minutes.

Example 2

(a) A Crosslinker

| # | Material | gm |
|---|---|---|
| 1 | Isocyanate[1] | 1876.00 |
| 2 | Dibutyltin dilaurate | 0.35 |
| 3 | Methyl isobutyl ketone (mibk) | 21.73 |
| 4 | Diethyleneglycol monobutyl ether | 454.24 |
| 5 | Ethyleneglycol monobutyl ether | 1323.62 |
| 6 | Methylisobutyl ketone (mibk) | 296.01 |

[1]Rubinate M, available from Huntsman Corporation

Procedure: All weights are in grams. Items 1, 2 and 3 are charged to a 4 neck round bottom flask, fit with a stirrer, temperature measuring probe and $N_2$ blanket. Charge 4 was added slowly allowing the temperature to increase to 60° C. The mixture was then held at 60° C. for 30 minutes. Charge 5 was then added over about 2 hours allowing the temperature to increase to a maximum of 110° C. Charge 6 was then added and the mixture was held at 110° C. until the i.r. spectrum indicates no residual isocyanate.

Example 3

(a) A Cationic Resin

| # | Material | Gm |
|---|---|---|
| 1 | EPON 828[1] | 614.68 |
| 2 | Bisphenol A | 265.42 |
| 3 | MACOL 98 A MOD 1[2] | 125.0 |
| 4 | Methylisobutyl ketone (mibk) | 31.09 |
| 5 | Ethyltriphenyl phosphonium iodide | 0.60 |
| 6 | MACOL 98 A MOD 1[2] | 125.00 |
| 7 | Methylisobutyl ketone (mibk) | 52.05 |
| 8 | Example 2, crosslinker | 719.67 |
| 9 | Ketimine[3] | 57.01 |
| 10 | N-methyl ethanolamine | 48.68 |
| 11 | sulfamic acid | 19.36 |
| 12 | H2O | 573.84 |
| 13 | H2O | 657.65 |
| 14 | H2O | 550.0 |

[1]Epoxy resin available from Hexion Specialty Chemicals.
[2]Bisphenol ethylene oxide adduct available from BASF Corporation.
[3]MIBK diketimine of diethylene triamine at 72.7% in MIBK.

Procedure: All weights are in grams. Items 1, 2, 3, 4 and 5 are charged to a 4 neck round bottom flask, fit with a stirrer, temperature measuring probe, $N_2$ blanket and heated to 130° C. The mixture exotherms to about 150° C. The temperature was allowed to drop to 145° C. and held at this temperature for 2 hours. Charges 6 and 7 were then added. Charges 8, 9 and 10 were added and the mixture was held at 122° C. for two hours. 877 g of the reaction mixture was poured into a solution of items 11 and 12 with good stirring. The resulting dispersion was mixed for thirty minutes and then charge 13 was added with stirring over about 30 minutes and mixed well. Charge 14 was added and mixed well. About 600 g of water and solvent are distilled off under vacuum at 60-65° C. The resulting aqueous dispersion had a solids content of 38.80%.

Example 4

(a) An Additive

| # | Description | Weight (gm) |
|---|---|---|
| 1 | 1,5,7-triazabicyclo(4.4.0)dec-5-ene | 50.00 |
| 2 | Toluene | 150.00 |
| 3 | 2-ethyl hexyl glycidyl ether | 79.2 |

Procedure: All weights are in grams. Items 1, and 2 are charged, under $N_2$, to a round bottom flask fitted with a mechanical stirrer, condenser, and temperature controlling probe. The mixture was heated to 60° C. Item 3 was added drop-wise over 30 minutes. The mixture was then brought to reflux and held at reflux for an hour. The toluene was then removed by first using ordinary distillation, followed by vacuum distillation at 60° C. Final product was, by theory, 100% nonvolatile.

Example 5

(a) A Blocked Isocyanate

| # | Material | Weight |
|---|---|---|
| 1 | Rubinate M[1] | 402.00 |
| 2 | Dibutyltin dilaurate | 0.08 |
| 3 | Mibk | 45.00 |
| 4 | Diethyleneglycol monobutyl ether | 97.34 |
| 5 | Ethylene glycol monobutyl ether | 207.41 |
| 6 | 1,5,7-triazabicyclo(4.4.0)dec-5-ene | 81.01 |
| 7 | Mibk | 23.42 |
|  | TOTAL | 856.26 |

[1]Polymeric isocyanate available from Huntsman Corp.

Procedure: All weights are in grams. Items 1, 2 and 3 are charged to a 4 neck round bottom flask, fit with a stirrer, temperature measuring probe and $N_2$ blanket. Charge 4 was added slowly allowing the temperature to increase to 60° C. The mixture was then held at 60° C. for 30 minutes. Charge 5 was then added over about 1 hour allowing the temperature to increase to a maximum of 110° C. The mixture was held for 30 minutes at 110° C. Charge 6 was then added and the mixture was held at 110° C. until the i.r. spectrum indicates no residual isocyanate. Heating was stopped; charge 7 was added and mixed well. The final product was titrated with 0.2 N HCl and found to contain 0.736 meq. base per gram of resin.

Example 6

(a) Cure Results Set 1

In the following cure examples, resins were made undispersed in solvent, blended with crosslinker (Cure example A and B) and catalyst, stirred until uniform, and allowed to set overnight. The coatings were then applied using a Bird Bar applicator to approximately 25 micron film thickness. The panels were then allowed to flash at room temperature for at least 1 hr, then cured in an electric oven at the temperature and time indicated. The panels were tested for cure by acetone double rubs using ASTM D5402-6 Method A with the following exceptions: Acetone was used rather than MIBK, no water cleaning of panel, 100 double rubs are done using a cheese cloth, and the rating scale was as listed below.

1 through to substrate in <50
2 Through in 50-100 rubs
3 Very severely marred. Scratches to metal easily
4 Severely marred only over area rubbed. Can Scratch to metal
5 Marred over rub area, can scratch through to metal
6 Marred uniformly in center of rub area, difficult, but possible to scratch to metal
7 Non uniform marring over rub area, can not scratch to metal
8 Scratching, very little marring of rub area, can not scratch to metal
9 Slight scratching of rub area, can not scratch to metal
10 No visible damage

| Cure Example | Main Vehicle | Crosslinker | Catalyst % R.S. | Solvent Resistance Acetone DR 160 C./30' | Acetone DR 177CF/30' |
|---|---|---|---|---|---|
| A | Resin as in Example 3, but undispersed, and without crosslinker (item 8 in the synthesis) and without any acid or water (items 11 through 14). The resin was diluted to 65% solids with propylene glycol methyl ether, then 1.6% water was added. | Polymeric MDI, 10 equivalents (functionality 2.7) reacted with 2 equivalents of ethylene glycol butyl ether, and 8 equivalents of diethylene glycol butyl ether. Blended with MV to form 35% crosslinker on resin solids. The blocked urethane crosslinkers were used at 65% solids in MIBK. | Dibutyl tin dilaurate, 0.76% Sn on resin solids | 100-no effect Rating = 10 | — |
| B | Resin as in Example 3, but undispersed, and without crosslinker (item 8 in the synthesis) and without any acid or water (items 11 through 14). The resin was diluted to 65% solids with propylene glycol methyl ether, then 1.6% water was added. | Polymeric MDI, 10 equivalents (functionality 2.7) reacted with 2 equivalents of ethylene glycol butyl ether, and 8 equivalents of diethylene glycol butyl ether. Blended with MV to form 35% crosslinker on resin solids. The blocked urethane crosslinkers were used at 65% solids in MIBK. | BCG-2EHGE (Additive from Example 2), 0.75% BCG on total resin solids | 100-no effect Rating = 10 | — |
| C | Resin as in Example 3, but undispersed, and without crosslinker (item 8 in the synthesis) and without any acid or water (items 11 through 14). The resin was diluted to 65% solids with propylene glycol methyl ether, then 1.6% water was added. | Polymeric MDI reacted with Diethyleneglycol monobutyl ether Ethylene glycol monobutyl ether 1,5,7-triazabicyclo(4.4.0)dec-5-ene (BCG). Blended with MV to form 35% crosslinker on resin solids. The blocked urethane crosslinkers were used at 65% solids in MIBK. | 0.75% BCG on resin solids from crosslinker | 100-scratch Rating = 8 | 100-no effect Rating = 10 |
| D | Resin as in Example 3, but undispersed, and without crosslinker (item 8 in the synthesis) and without any acid or water (items 11 through 14. The resin was diluted to 65% solids with propylene glycol methyl ether, then 1.6% water was added. | Polymeric MDI, 10 equivalents (functionality 2.7) reacted with 10 equivalents of caprolactam. Blended with MV to form 35% crosslinker on resin solids. | BCG-2EHGE (Additive from Example 2), 0.75% BCG on total resin solids | 100-no effect Rating = 10 | 100-no effect Rating = 10 |
| E** | Resin as in Example 3, but undispersed, and without crosslinker (item 8 in the synthesis) and without any acid or water (items 11 through 14). Additionally, enough of the n methyl ethanol amine was replaced | Poly functional blocked urethane made from 24.6 parts ketoxime, 12.6 parts TMP, 62.7 parts IPDI. Blended with MV to form 35% crosslinker on resin solids. | BCG reacted into resn, 0.75% on total resin solids | 100-no effect Rating = 10 | 100-no effect Rating = 10 |

| Cure Example | Main Vehicle | Crosslinker | Catalyst % R.S. | Solvent Resistance Acetone DR 160 C./30' | Acetone DR 177CF/30' |
|---|---|---|---|---|---|
| | with BCG to provide 0.75% BCG on total resin solids. The resin was diluted to 65% solids with propylene glycol methyl ether, then 1.6% water was added. | | | | |
| F | Undispersed resin synthesized as in example 1 with integral carbamate crosslinker, 71% solids in MIBK solvent with 1.2% water added to resin solution | Aliphatic carbamate integral in resin | Dibutyl tin dilaurate 0.76% Sn on resin solids | | 100-no effect Rating = 10 |
| G | Undispersed resin synthesized as in example 1 with integral carbamate crosslinker, 71% solids in MIBK solvent with 1.2% water added to resin solution | Aliphatic carbamate integral in resin | BCG-2EHGE (Additive from Example 4), 0.75% BCG on total resin solids. | | 100-no effect Rating = 10 |
| H | Undispersed resin synthesized as in example 1 with integral carbamate crosslinker, 71% solids in MIBK solvent with 1.2% water added to resin solution | Aliphatic carbamate integral in resin | BCG-2EHGE (Additive from Example 4), 1.5% BCG on total resin solids. | | 100-no effect Rating = 10 |

BCG = ,5,7-triazabicyclo(4.4.0)dec-5-ene
**Also 100 ADR no effect cured at 135 C. 30'

Example 7

(a) A Cationic Resin

| # | Material | Parts |
|---|---|---|
| 1 | EPON 828[1] | 1023 |
| 2 | Bisphenol A-ethylene oxide adduct | 365 |
| 3 | Bisphenol A | 297 |
| 4 | 2-Butoxyethanol | 187.2 |
| 5 | Benzyldimethylamine | 1.4 |
| 6 | Benzyldimethylamine | 3.0 |
| 7 | Diketimine[1] | 182.3 |
| 8 | N-methylethanolamine | 85.2 |
| 9 | Sulfamic acid | 171.1 |
| 10 | Deionized water | 1065.9 |
| 11 | Deionized water | 735.9 |
| 12 | Deionized water | 1156.4 |
| 13 | Deionized water | 867.3 |

[1]See Example 1

Materials #1-4 (EPON 828, bisphenol A-ethylene oxide adduct, bisphenol A and 2-butoxyethanol) were charged into a reaction vessel and heated under a nitrogen atmosphere to 125° C. The first portion of the benzyldimethylamine, Material #5, was added and the reaction allowed to exotherm to around 180° C. When the reaction reached 160° C., a one hour hold was started. After the peak exotherm the resin was allowed to cool back to 160° C., continuing the hold. After the hold the reaction was then cooled to 130° C. and the second portion of benzyldimethylamine Material #6, was added. The reaction was held at 130° C. until an extrapolated epoxy equivalent weight of 1070. At the expected epoxy equivalent weight materials 7 and 8 (Diketimine and N-methylethanolamine) were added in succession and the mixture allowed to exotherm to around 150° C. At the peak exotherm a one hour hold was started while allowing the reaction to cool to 125° C. After the one hour hold the resin was dispersed in an aqueous medium consisting of sulfamic acid and the first portion of deionized water. The dispersion was later reduced with the second, third, and fourth portions of deionized water. The resulting cationic soap was vacuum striped until the methyl isobutyl ketone liberated by the hydrolysis of the diketime was less than 0.05%.

To 2517 g of the above aqueous polymer solution was added 443 g deionized water. The mixture was heated to 70° C. under a nitrogen blanket. 66.4 g of an 85% solution of EPON 828 in mibk was then added over 15 minutes with good agitation. 5.81 g of mibk was added as a rinse for the EPON 828 solution and the mixture held at 70° C. for 45 minutes. The mixture was heated to 90° C. over 70 minutes and held at this temperature for 3 hours with good mixing. 337 g of deionized water was then added and the dispersion cooled to less than 35° C. and poured out.

Example 8

(a) A Cationic Resin

| # | Material | Parts |
|---|---|---|
| 1 | EPON 828 | 752 |
| 2 | bisphenol a | 228 |
| 3 | Butyl carbitol formal | 108.89 |
| 4 | etppi | 0.752 |
| 5 | Butyl carbitol formal | 298.63 |
| 6 | JEFFAMINE d2000 | 2687.74 |
| 7 | sulfamic acid | 131.93 |
| 8 | H2O | 7812.62 |

Materials 1, 2, 3 are added to a suitably equipped round bottom flask. The mixture was then heated to 125° C. Material 4 was then added. The reaction mixture was allowed to exotherm to 160° C., add heat as required to reach 160° C. The reaction mixture was then held at 160-170° C. for 1 hr. Material 5 was added and mixed well. Material 6 was then added as rapidly as possible. The resulting reaction mixture was heated to 130° C., and held for 3 hrs. Materials 7, and 8 are preblended and the reaction mixture was added to the acidic water solution under agitation to form a cationic dispersion.

Example 9

(a) A Cationic Resin

| # | Material | gm |
|---|---|---|
| 1 | EPON 828[1] | 307.34 |
| 2 | Bisphenol A | 132.71 |
| 3 | MACOL 98 A MOD 1[2] | 62.50 |
| 4 | Methylisobutyl ketone (mibk) | 15.54 |
| 5 | Ethyltriphenyl phosphonium iodide | 0.30 |
| 6 | MACOL 98 A MOD 1[2] | 62.50 |
| 7 | Methylisobutyl ketone (mibk) | 34.30 |
| 8 | Ketimine[3] | 28.50 |
| 9 | N-methyl ethanolamine | 7.80 |
| 10 | 1,5,7-triazabicyclo(4.4.0)dec-5-ene | 30.66 |
| 11 | Example 2, crosslinker | 458.05 |
| 12 | sulfamic acid | 23.17 |
| 13 | H2O | 568.1 |
| 14 | H2O | 780.2 |
| 15 | H2O | 550.0 |

[1]Epoxy resin available from Hexion Specialty Chemicals
[2]Bisphenol ethylene oxide adduct available from BASF Corporation.
[3]MIBK diketimine of diethylene triamine at 72.7% in MIBK Procedure: All weights are in grams. Items 1, 2, 3, 4 and 5 are charged to a 4 neck round bottom flask, fit with a stirrer, temperature measuring probe, $N_2$ blanket and heated to 130° C. The mixture exotherms to about 150° C. The temperature was allowed to drop to 145° C. and held at this temperature for 2 hours. Charges 6 and 7 were then added. Charges 8, 9 and 10 were added and the mixture was held at 122° C. for two hours. Charge 11 (preheated to ~60° C.) was added and mixed for 10 minutes without heat. 969 g of the reaction mixture was poured into a solution of items 12 and 13 with good stirring. The resulting dispersion was mixed for thirty minutes and then charge 14 was added with stirring over about 30 minutes and mixed well. Charge 15 was added and mixed well. About 600 g of water and solvent are distilled off under vacuum at 60-65° C. The resulting aqueous dispersion had a solids content of 34.16%.

Example 10

(a) A Cationic Resin

| # | Material | gm |
|---|---|---|
| 1 | EPON 828[1] | 614.68 |
| 2 | Bisphenol A | 265.42 |
| 3 | MACOL 98 A MOD 1[2] | 125.0 |
| 4 | Methylisobutyl ketone (mibk) | 31.09 |
| 5 | Ethyltriphenyl phosphonium iodide | 0.60 |
| 6 | MACOL 98 A MOD 1[2] | 125.00 |
| 7 | Methylisobutyl ketone (mibk) | 50.10 |
| 8 | Example 2, crosslinker | 894.95 |
| 9 | Ketimine[3] | 57.01 |
| 10 | N-methyl ethanolamine | 48.68 |
| 11 | sulfamic acid | 40.52 |
| 12 | H2O | 1196.9 |
| 13 | Gum rosin solution[4] | 17.92 |
| 14 | H2O | 1623.3 |
| 15 | H2O | 1100.0 |

[1]Epoxy resin available from Hexion Specialty Chemicals.
[2]Bisphenol ethylene oxide adduct available from BASF Corporation.
[3]MIBK diketimine of diethylene triamine at 72.7% in MIBK.
[4]30% by weight solution of gum rosin in diethylene glycol mono butyl ether formal.

Procedure: All weights are in grams. Items 1, 2, 3, 4 and 5 are charged to a 4 neck round bottom flask, fit with a stirrer, temperature measuring probe, $N_2$ blanket and heated to 130° C. The mixture exotherms to about 150° C. The temperature was allowed to drop to 145° C. and held at this temperature for 2 hours. Charges 6 and 7 were then added. Charges 8, 9 and 10 were added and the mixture was held at 122° C. for two hours. 1991 g of the reaction mixture was poured into a solution of items 11 and 12 with good stirring. Charge 13 was then added and the resulting dispersion was mixed for thirty minutes and then charge 14 was added with stirring over about 30 minutes and mixed well. Charge 15 was added and mixed well. About 1100 g of water and solvent are distilled off under vacuum at 60-65° C. The resulting aqueous dispersion had a solids content of 39.37%.

Example 11

(a) A Cationic resin

| # | Material | gm |
|---|---|---|
| 1 | DER 732[1] | 711 |
| 2 | Bisphenol A | 164.5 |
| 3 | benzyldimethyl amine | 1.65 |
| 4 | butyl Carbitol formal[2] | 78.8 |
| 5 | JEFFAMINE D400[3] | 184.7 |
| 6 | bisphenol A diglycidyl ether[4] | 19.1 |
| 7 | butyl Carbitol formal | 3.4 |
|   | Resin from reaction product of materials 1-7 | 988.6 |
| 8 | Deionized water | 1242.13 |
| 9 | Sulfamic acid | 30.2 |
| 10 | Deionized water | 614.8 |

[1]Aliphatic epoxy resin available from Dow Chemical Co.
[2]Available as MAZON 1651 from BASF Corporation
[3]Polyoxypropylene diamine available from Huntsman Corp.
[4]Available from Hexion Corporation as EPON 828

Materials 1 and 2 are charged into a suitably equipped 3-liter round-bottomed flask. The mixture was heated to 130°

C. and Material 3 was added. The reaction mixture was held at 135° C. until the epoxide equivalent weight of the mixture was 1232. Material 4 was then added and then the mixture was cooled to 95° C. Material 5 was added and the reaction held at 95° C. until the Gardner-Holdt viscosity of a sample of the resin diluted 50/50 in methoxy propanol is "H-J". A mixture of materials 6 and 7 were added and the mixture held until the Gardner-Holdt viscosity of a sample of the resin diluted 50/50 in methoxy propanol was "Q–". 988.6 g of this resin was poured into a mixture of 1242.13 g deionized water and 30.2 g sulfamic and mixed for 30 minutes. 614.8 g deionized water was then added and mixed well. The final aqueous dispersion had a measured solids content of 35.8%

Example 12

(a) A Pigment Paste

| # | Material | Parts |
|---|---|---|
| 1 | Cationic Resin Example 11 | 1793 |
| 2 | SURFYNOL GA[1] | 5.28 |
| 3 | $TiO_2$[2] | 157.54 |
| 4 | Kaolin Clay[3] | 1235.82 |
| 5 | Carbon Black[4] | 16.94 |
| 6 | Deionized water | 41.36 |

[1]A Surfactant available from Air Products Inc.
[2]CR800E available from Kerr McGee
[3]ASP-200 available from BASF Corporation.
[4]CSX-333 carbon black available from Cabots Inc.

Materials 1 and 2 were preblended in a flat bottom metal container. Materials 3 through 5 were added sequentially to the mixture under a high shear cowles. The paste was cowles for 30 min. Material 6 was added under low shear mixing and the paste was stirred until uniform. The paste was then transferred to a RED HEAD medial mill equipped with a water cooling jacket and using 2 mm zircoa media. The paste was then milled until a Hegman of ≥7 was observed.

Example 13

(a) A Paint

| # | Material | Parts |
|---|---|---|
| 1 | Example 8, Cationic resin | 113.73 |
| 2 | Butyl carbitol Formal[1] | 4.61 |
| 3 | Example 7, Cationic resin | 40.98 |
| 4 | Example 9 Cationic resin | 504.52 |
| 5 | Example 10 Cationic resin | 369.37 |
| 6 | Ethylene Glycol hexyl ether | 10.36 |
| 7 | Deionized water | 24 |
| 8 | Example 12, Pigment Paste | 129.26 |
| 9 | Deionized water | 1789.32 |

[1]Available as MAZON 1651 from BASF Corporation

Materials 1-9 are added sequentially under agitation and stirred until uniform to create the resin blend. This results in a paint with 1.28% on RS of 1,5,7-triazabicyclo(4.4.0)dec-5-ene coming from the resin. Twenty percent by weight of the paint was removed by ultrafiltration and replaced by deionized water.

Example 14

(a) A Paint

| # | Material | Parts |
|---|---|---|
| 1 | Cationic resin Example 8 | 754.12 |
| 2 | Butyl carbitol Formal[1] | 40.39 |
| 3 | Cationic resin Example 7 | 359.10 |
| 4 | Cationic resin[2] | 6556.21 |
| 5 | Ethylene Glycol hexyl ether | 90.86 |
| 6 | Deionized water | 214 |
| 7 | Example 12, Pigment Paste | 1357.80 |
| 8 | Dibutyl tin oxide paste[3] | 147.63 |
| 9 | Deionized water | 9472.05 |

[1]Available as MAZON 1651 from BASF Corporation.
[2]Similar to Example 3, but with the addition of 0.5% gum rosin on resin solids, total solids of 42.8%
[3]A cationic dibutyl tin oxide paste consisting of a sulfonium epoxy grind vehicle and dibutyl tin oxide, total solids of 55.7 in water, dibutyl tin oxide weight percent was 36.63.

Materials 1-9 are added sequentially under agitation and stirred until uniform to create the resin blend. This results in a paint with 1.3% on RS of dibutyl tin oxide catalyst and was used as a control reference. Twenty percent by weight of the paint was removed by ultrafiltration and replaced by deionized water.

Example 15

(a) A Grind Vehicle

| # | Material | gm |
|---|---|---|
| 1 | EPON 828[1] | 533.2 |
| 2 | nonyl phenol | 19.1 |
| 3 | bisphenol A | 198.3 |
| 4 | ethyltriphenyl phosphonium iodide | 0.7 |
| 5 | butoxy propanol | 201.6 |
| 6 | methoxy propanol | 50.4 |
| 7 | 1,5,7-triazabicyclo(4.4.0)dec-5-ene | |

[1]Epoxy resin available from Hexion Specialty Chemicals

Procedure: All weights are in grams. Items 1, 2, 3, 4 and 5 are charged to a 4 neck round bottom flask, fit with a stirrer, temperature measuring probe, $N_2$ blanket and heated to 130° C. The mixture exotherms to 160-180° C. Hold at 160-170° C. for 1 hour. Turn heat off and add 6 slowly. At 60° C. add 7. Allow the mixture to exotherm to 110° C. then hold at 110-120° C. for 1 hour. To 920 g of the reaction mixture, add 39 g sulfamic acid and 1153 g deionized water and mix well. Add an additional 15.6 g sulfamic acid and mix well. The mixture was a viscous slightly hazy solution with a solids content of 38.2%.

Example 16

(a) Grind Vehicle pH Adjustment

| 1 | Example 15, Grind Vehicle | 809.9 |
|---|---|---|
| 2 | 10% sulfamic acid solution | 49.26 |

Materials were added sequentially resulting in a resin dispersion with pH of 7.05.

(b) A Pigment Paste

| # | Material | Parts |
|---|---|---|
| 1 | pH adjusted GV from above | 595.44 |
| 2 | SURFYNOL GA[1] | 1.45 |
| 3 | $TiO_2$[2] | 43.14 |
| 4 | Kaolin Clay[3] | 338.63 |
| 5 | Carbon Black[4] | 4.64 |
| 6 | Deionized water | 46.7 |

[1] A Surfactant available from Air Products Inc.
[2] CR800E available from Kerr McGee
[3] ASP-200 available from BASF Corporation.
[4] CSX-333 carbon black available from Cabots Inc.

Materials 1 and 2 were preblended in a flat bottom metal container. Materials 3 through 5 were added sequentially to the mixture under a high shear cowles. The paste was cowlesed for 30 min. Material 6 was added under low shear mixing and the paste was stirred until uniform. The paste was then transferred to a RED HEAD medial mill equipped with a water cooling jacket and using 2 mm zircoa media. The paste was then milled until a Hegman of >7 was observed.

Example 17

(a) A Paint

| # | Material | Parts |
|---|---|---|
| 1 | Cationic resin, Example 8 | 191.1 |
| 2 | Butyl carbitol Formal[1] | 7.73 |
| 3 | Cationic resin, Example 7 | 68.76 |
| 4 | Example 3 Cationic resin (at 38.1% NV) | 1400.34 |
| 5 | Ethylene Glycol hexyl ether | 17.4 |
| 6 | Pigment Paste, Example 16 | 256.43 |
| 7 | Deionized water | 1871.7 |

[1] Available as MAZON 1651 from BASF Corporation

Materials 1-7 are added sequentially under agitation and stirred until uniform to create the resin blend. This results in a paint with 1.25% on RS of 1,5,7-triazabicyclo(4.4.0)dec-5-ene coming from the grind vehicle. Fifteen percent by weight of the paint was removed by ultrafiltration and replaced by deionized water.

Example 18

(a) A Paint

| # | Material | Parts |
|---|---|---|
| 1 | Cationic resin Example 8 | 148.28 |
| 2 | Butyl carbitol Formal[1] | 6 |
| 3 | Cationic resin, Example 7 | 53.35 |
| 4 | Example 3 Cationic resin (at 38.1% NV) | 1086.56 |
| 5 | Ethylene Glycol hexyl ether | 13.5 |
| 6 | Example 12, Pigment Paste | 168.03 |
| 7 | Deionized water | 1092.31 |

[1] Available as MAZON 1651 from BASF Corporation

Materials 1-5 are added sequentially under agitation and stirred until uniform to create the resin blend. Material 6 was added and the paint was allowed to stir until uniform. Material 7 was added, and the paint was allowed to stir overnight. This results in a paint with no catalyst.

Example 19

(a) A Cationic Resin

| | | |
|---|---|---|
| A | EPON 880[1] | 464.01 |
| | Bisphenol A | 153.61 |
| | Ethylene glycol mono-2-ethyl hexyl ether | 12.00 |
| B | Ethyltriphenyl phosphonium iodide | 0.72 |
| C | Ethylene glycol mono-2-ethyl hexyl ether | 56.76 |
| D | Crosslinker[2] | 495.07 |
| E | 1,5,7-triazabicyclo(4.4.0)dec-5-ene | 21.21 |
| F | sulfamic acid | 27.55 |
| | H2O | 438 |
| G | H2O | 891.97 |
| H | H2O | 131 |

[1] Epoxy resin available from Hexion Specialty Chemicals
[2] Crosslinker prepared from the reaction of Hexamethylene triamine and propylene carbonate (detailed below).

Procedure: All weights are in grams. Items A and B are charged to a 4 neck round bottom flask, fit with a stirrer, temperature measuring probe, $N_2$ blanket and heated to 125° C. The mixture exotherms. Begin 1 hour hold at 160° C. The peak exotherm was 171° C. and the temperature allowed to drop to 160° C. After 1 hour, charge C was added. Charge D then was added and the mixture was held at 115° C. for 30 minutes. Charge E then was added and the mixture held for an additional 30 minutes. 1260 g of the reaction mixture was poured into a solution of item F with good stirring. The resulting dispersion was mixed for thirty minutes and then charge G was added with stirring over about 30 minutes and mixed well. Charge H was added and mixed well. Water and solvent then were distilled off under vacuum at 60-65° C. The resulting aqueous dispersion had a solids content 39.19%.

(b) Preparation of the crosslinker

| 1 | Bishexamethylene triamine | 135.4 |
|---|---|---|
| 2 | Propylene carbonate | 112.3 |
| 3 | Ethylene glycol mono-2-ethyl hexyl ether | 61.93 |

Charge 1 to a reactor. Add 2 dropwise over two hours. The reaction exotherms. Adjust the addition rate such that the temperature does not exceed 70° C. The reaction was then diluted with ethylene glycol mono-2-ethyl hexyl ether.

Example 20

(a) A Paint

| # | Material | Parts |
|---|---|---|
| 1 | Cationic resin Example 19 | 1454 |
| 2 | Deionized water | 2346 |

Materials 1 and 2 are added sequentially under agitation and stirred until uniform to create the resin blend. This results in a paint with 1.99% on RS of 1,5,7-triazabicyclo(4.4.0)dec-5-ene.

Example 21

(a) Cure Results Set 2

The electrodepositable coating compositions of examples 13, 14, 17, 18, 20 were electrodeposited onto phosphated steel under conditions sufficient to provide an electrodeposited film thickness of about 24 micrometers using procedures known to those skilled in the art. The panels were then cured in an electric oven at the temperatures and times indicated. The panels were tested for cure by acetone double rubs using ASTM D5402-6 Method A with the following exceptions: Acetone was used rather than MIBK, no water cleaning of panel, 100 double rubs are done using a cheese cloth, and the rating scale is as listed below.

| | |
|---|---|
| 1 | through to substrate in <50 |
| 2 | Through in 50-100 rubs |
| 3 | Very severely marred. Scratches to metal easily |
| 4 | Severely marred only over area rubbed. Can Scratch to metal |
| 5 | Marred over rub area, can scratch through to metal |
| 6 | Marred uniformly in center of rub area, difficult, but possible to scratch to metal |
| 7 | Non uniform marring over rub area, can not scratch to metal |
| 8 | Scratching, very little marring of rub area, can not scratch to metal |
| 9 | Slight scratching of rub area, can not scratch to metal |
| 10 | No visible damage |

| Paint Example | % DBTO on Resin Solids | % BCG* Additive on Resin Solids | Temp | Time | Acetone double Rub Rating | Rubs |
|---|---|---|---|---|---|---|
| Example 13 | 0 | 1.28 | 138 C. | 30' | 1 | 5 |
| | | | 149 C. | 30' | 8 | 100 |
| | | | 160 C. | 30' | 8 | 100 |
| | | | 171 C. | 30' | 8 | 100 |
| Example 17 | 0 | 1.25 | 138 C. | 30' | Not run | Not run |
| | | | 149 C. | 30' | Not run | Not run |
| | | | 160 C. | 30' | 2 | 81 |
| | | | 171 C. | 30' | 6 | 100 |
| Example 20 | 0 | 1.99 | 138 C. | 25' | Not run | Not run |
| | | | 149 C. | 25' | 7/8 | 100 |
| | | | 160 C. | 25' | 8 | 100 |
| | | | 171 C. | 25' | 8/9 | 100 |
| Example 18 | 0 | 0 | 138 C. | 30' | Not run | Not run |
| | | | 149 C. | 30' | 1 | 2 |
| | | | 160 C. | 30' | 1 | 3 |
| | | | 171 C. | 30' | 1 | 5 |
| Example 14 | 1.3 | 0 | 138 C. | 30' | Not run | Not run |
| | | | 149 C. | 30' | 1 | 12 |
| | | | 160 C. | 30' | 7 | 100 |
| | | | 171 C. | 30' | 8 | 100 |

*1,5,7-triazabicyclo(4.4.0)dec-5-ene

Example 22

(a) A Catalyst Paste

| # | Material | gms |
|---|---|---|
| 1 | Example 11, Cationic Resin | 515.70 |
| 2 | Bismuth III Oxide | 241 |
| 3 | Sulfamic Acid | 100 |
| 4 | Deionized Water | 315 |
| 5 | Deionized Water | 50 |

Materials 1 and 2 were added to 2 liter steel beaker and mixed under high shear cowles blade agitation. Materials 3 and 4 were premixed and added slowly to the bismuth resin paste and the resulting mixture was stirred under high shear cowles agitation for an additional 30 minutes. Material 5 was added, and the paste was media milled 3 hours in a Chicago Boiler Red Head Mill equipped with a water cooling jacket using 2 mm round zircoa media.

Example 23

(a) A Grind Vehicle

This example describes the preparation of a quaternary ammonium salt containing pigment-grinding resin. Example 23-1 describes the preparation of an amine-acid salt quaternizing agent and Example 23-2 describes the preparation of an epoxy group-containing polymer that was subsequently quaternized with the amine-acid salt of Example 23-1.

23-1

The amine-acid salt quaternizing agent was prepared using the following procedure:

| # | Material | Parts |
|---|---|---|
| 1 | Dimethyl ethanolamine | 445 |
| 2 | PAPI 290[1] | 660 |
| 4 | 88% lactic acid aqueous | 512 |
| 5 | Deionized water | 2136.11 |

[1]Polymeric diisocyanate commercially available from Dow Chemical Co.
2. Available as MAZON 1651 from BASF Corporation To a suitably equipped 5 liter flask material 1 was charged. Material 2 was then charged under mild agitation over a 1.5 hour period, followed by a rinse of material 3. During this addition, the reaction mixture was allowed to exotherm to a temperature of about 89° C. and held at that temperature for about 1 hour until complete reaction of the isocyanate as determined by infrared spectroscopy. At that time, material 4 was added over a 25 minute period, followed material 5. The reaction temperature was held at about 80° C. for about 6 hours until a stalled acid value of 70.6 was obtained.

23-2

The quaternary ammonium salt group-containing polymer was prepared using the following procedure.

| # | Material | Parts |
|---|---|---|
| 1 | Bisphenol A Diglycidyl ether[1] | 528.8 |
| 2 | Bisphenol A | 224.9 |
| 3 | Butyl Carbitol Formal[2] | 83.7 |
| 4 | ethyltriphenylphosphonium iodide | 0.5 |
| 5 | Butyl Carbitol Formal[2] | 164.9 |
| 6 | amine-acid quaternizing agent 23-1 | 418.4 |
| 7 | Deionized water | 1428.1 |
| 8 | Butyl Carbitol Formal[2] | 334.7 |

[1]Diglycidyl ether of Bisphenol A commercially available from Resolution Chemical Co as EPON 828.
[2]Available as MAZON 1651 from BASF Corporation Material 1 was charged to a suitably equipped 5 liter flask were added, under mild agitation. Material 2 was then added followed by material 3 and material 4. The reaction mixture was heated to about 140° C., allowed to exotherm to about 180° C., then cooled to about 160° C. and held at that temperature for about 1 hour. At that time the polymeric product had an epoxy equivalent weight of 982.9. The reaction mixture was then cooled to a temperature of about 130° C. at which time material 5 was added and the temperature lowered to about 95°-100° C., followed by the addition of material 6, the amine-acid quaternizing agent of 23-1 over a period of 15 minutes, and subsequently followed by the addition of about 1428.1 parts by weight of deionized water. The reaction temperature was held at about 80° C. for approximately 6 hours until the acid number of the reaction product fell below 1.0. The resultant quaternary ammonium salt group-containing pigment grinding resin was further reduced with about 334.7 parts by weight of the solvent of Butyl Carbitol Formal.

Example 24

(a) A Grind Vehicle

| # | Material | gm |
|---|---|---|
| 1 | EPON 828[1] | 533.2 |
| 2 | nonyl phenol | 19.1 |
| 3 | bisphenol A | 198.3 |
| 4 | ethyltriphenyl phosphonium iodide | 0.7 |
| 5 | butoxy propanol | 99.3 |
| 6 | butoxy propanol | 93.9 |
| 7 | methoxy propanol | 50.3 |
| 8 | Thiodiethanol | 121.3 |
| 9 | butoxy propanol | 6.9 |
| 10 | deionized water | 32.1 |
| 11 | dimethylol propionic acid | 133.1 |
| 12 | Deionized water | 1100 |
| 13 | Deionized water | 790 |

[1]Diglycidyl ether of Bisphenol A commercially available from Resolution Chemical Co as EPON 828.

Charge materials 1 through 5 to a suitably equipped flask and heat to 125° C. The mixture was allowed to exotherm to 175° C. and then held at 160-165° C. for 1 hr. After the 1 hr hold add materials 6-7. Cool to 80° C. and add materials 8-11. Hold at 78° C. until the measured acid value was less than 2. When the acid value was OK, pour 1288.2 g of the resin into 1100 g of deionized water (material 12) with stirring. Mix for 30 minutes then add material 13 and mix well. 30% of the coating composition was removed by ultrafiltration and replaced with deionized water.

Example 25

(a) A Pigment Paste

| # | Material | gm |
|---|---|---|
| 1 | Cationic Resin example 23 | 418.6 |
| 2 | Cationic Resin example 24 | 2267.2 |
| 3 | SURFYNOL GA[1] | 84.5 |
| 4 | Ethylene glycol hexyl ether | 39 |
| 5 | $TiO_2$[2] | 2780 |
| 6 | POLSPERSE 10[3] | 208 |
| 7 | PRINTEX 200[4] | 52 |
| 8 | Yttrium Oxide | 84.5 |
| 9 | Deionized water | 300 |
| 10 | FA810[5] | 4698.9 |

[1]A Surfactant available from Air Products Inc.
[2]CR800E available from Kerr McGee
[3]A Kaolin clay available from IMERYS Inc.
[4]A carbon black available from Degussa Inc.
[5]A cationic silica paste, 10.52% parts silica, manufactured by PPG Industries.

Materials 1-8 were preblended in a flat bottom plastic container. Material 9 was added to the mixture to reduce viscosity. The paste was then milled on a PREMIER mill until a Hegman reading of >7 was observed. Material 10 was then added to the paste and the paste was milled for an additional hour.

Example 26

(a) A Paint

| # | Material | Parts |
|---|---|---|
| 1 | W7718. Cationic resin Blend[1] | 100 |
| 2 | Pigment paste Example 25 | 14.89 |
| 3 | Catalysts paste Example 22 | 2.45 |
| 4 | Deionized water | 84.24 |

[1]A cationic, automotive electrodepositable resin blend commercially available from PPG Industries Materials 1 through 4 are added sequentially under agitation and allowed to stir 24 hours. This paint was 21.5% solids, 1.2% bismuth on total resin solids from all paint components. This paint was made to a scale of 12000 grams. 30% of the coating composition was removed by ultrafiltration and replaced with deionized water.

Example 27

(a) An Additive Dispersion

| # | Material | gm |
|---|---|---|
| 1 | Sulfamic Acid | 8.05 |
| 2 | Deionized water | 60 |
| 3 | Example 4 | 31.95 |

Materials 1 and 2 were blended until uniform. Material 3 was then added under agitation forming a dispersion.

Example 28

(a) A Paint

| # | Material | gm |
|---|---|---|
| 1 | Electrodepositable coating Example 26 | 2865.67 |
| 2 | Additive dispersion Example 27 | 34.7 |
| 3 | Deionized water | 99.63 |

Material 2 and 3 were preblended and added to a portion of paint 1 (material 1) under agitation. This paint was 21.0% solids, 1.17% bismuth, and 2% of Additive of example 4 on total resin solids from all paint components. 30% of the coating composition was removed by ultrafiltration and replaced with deionized water.

Example 29

(a) A Cationic Resin

| # | Material | gm |
|---|---|---|
| 1 | EPON 828[1] | 430.27 |
| 2 | Bisphenol A | 185.8 |
| 3 | MACOL 98 A MOD 1[2] | 87.5 |
| 4 | Methylisobutyl ketone (mibk) | 21.76 |
| 5 | Ethyltriphenyl phosphonium iodide | 0.42 |
| 6 | MACOL 98 A MOD 1[2] | 65.54 |
| 7 | Methylisobutyl ketone (mibk) | 12.13 |
| 8 | Ketimine[3] | 53.37 |
| 9 | N-methyl ethanolamine | 28.06 |
| 10 | 1,5,7-triazabicyclo(4.4.0)dec-5-ene | 10.73 |
| 11 | Crosslinker[4] | 434.44 |
| 12 | sulfamic acid | 43.46 |
| 13 | H2O | 1080.18 |
| 14 | H2O | 1521.15 |

[1]Epoxy resin available from Hexion Specialty Chemicals.
[2]Bisphenol ethylene oxide adduct available from BASF Corporation.
[3]MIBK diketimine of diethylene triamine at 72.7% in MIBK.
[4]MDI blocked urethane crosslinker, the reaction product of 10 equivalents of Lupranate M70L (a polymeric MDI), 2 equivalents of ethanol and 8 equivalents of methanol. Used at 80% solids in MIBK.

Procedure: All weights are in grams. Items 1, 2, 3, 4 and 5 are charged to a 4 neck round bottom flask, fit with a stirrer, temperature measuring probe, $N_2$ blanket and heated to 130° C. The mixture exotherms, but was not allowed to exceed 145° C. The temperature was held at 145° C. and for 2 hours. Charges 6 and 7 were then added. Reaction was allowed to proceed until an epoxy equivalent weight of 1167 was observed. Charges 8, 9 and 10 were added and the mixture was held at 122° C. for two hours. The heat was turned off, and material 11 was added and the mixture was stirred for 10 minutes. The reaction mixture was poured into a solution of items 12 and 13 with good stirring. After 30 minutes, material 14 was added slowly over 30 minutes. About 700 g of water and solvent are distilled off under vacuum at 60-65° C., and replenished with deionized water The resulting aqueous dispersion had a solids content of 37.9%.

Example 30

(a) A Cationic Resin

| | | |
|---|---|---|
| 1 | MAZEEN 355 70[1] | 1423.49 |
| 2 | acetic acid | 15.12 |
| 3 | Dibutyltindilaurate | 1.52 |
| 4 | Toluene diisocyanate 80/20 | 200.50 |
| 5 | sulfamic acid | 79.73 |
| 6 | deionized H2O | 1623.68 |
| 7 | deionized H2O | 766.89 |

[1]Amine functional diol of amine equivalent weight 1131 available from BASF Corporation.

Items 1 and 2 are charged to a 4 neck round bottom flask, fit with a stirrer, temperature measuring probe and $N_2$ blanket and mixed for 10 minutes. Item 3 was added and then item 4 was charged over about 1 hour allowing the reaction mixture to exotherm to a maximum temperature of 100° C. The mixture was then held at 100° C. until the infrared spectrum indicates the absence of isocyanate (approximately 1 hour). 1395 g of the reaction mixture was poured into a mixture of items 5 and 6 and mixed for 1 hour. Item 7 was then added over about 1 hour and mixed for about 1 hour. The resulting aqueous solution had a solids content of about 36%.

Example 31

(a) A Paint

| # | Material | Parts |
|---|---|---|
| 1 | Cationic resin Example 29 | 1371.5 |
| 2 | plasticizer[1] | 189.8 |
| 3 | Butyl carbitol Formal[2] | 39.5 |
| 4 | Propylene glycol phenyl ether | 3.5 |
| 5 | Cationic Resin Example 30 | 36.6 |
| 6 | Cationic Resin Example 7 | 73.3 |
| 7 | Noromox C5[3] | 3.3 |
| 8 | Surfactant Blend[4] | 5.2 |
| 9 | Paste[5] | 212.1 |
| 10 | Deionized water | 1865.3 |

[1]A plasticizer available from PPG industries.
[2]Available as MAZON 1651 from BASF Corporation.
[3]A surfactant available from CECA S.A.
[4]A blend of solvents and surfactants consisting of 31.26 parts ethylene glycol butyl ether, 31.26 parts SURFYNOL 104 ™ available from Air Product Inc, 32.46 parts Noramox C5 available from CECA S.A., 5 parts acetic acid.
[5]Similar paste to Example 12 with material 1 replace by the grind vehicle of example 24 on a resin solids basis. Used at 57% total solids.

Materials 1-8 are added sequentially under agitation and stirred until uniform to create the resin blend. Material 9 was added and the paint was allowed to stir until uniform, minimum 30 minutes. Material 10 was added, and the paint was allowed to stir until uniform, minimum 30 minutes.

Example 32

(a) A Paint

| # | Material | Parts |
|---|---|---|
| 1 | Paint from Example 31 | 3200 |
| 2 | Ethylene Glycol Butyl Ether | 9.5 |
| 3 | Ethylene Glycol Hexyl Ether | 9.5 |
| 4 | Zinc Oxide (ZnO) | 1.73 |

Materials 1 through 4 were added sequentially to a 4 liter container under agitation with 10 minutes stirring between adds. This results in an electrodepositable paint with 0.7% 1,5,7-triazabicyclo(4.4.0)dec-5-ene and 0.2% zinc metal on resin solids.

Example 33

(a) Cure Results Set 3

For of examples 24, 26, 31, and 32, each electrodepositable coating compositions was then electrodeposited onto phosphated cold rolled steel under conditions sufficient to provide an electrodeposited film thickness of about 24 micrometers. The panels were then cured for 20 minutes at 175 C and tested for cure by acetone double rubs using ASTM D5402-6 Method A with the following exceptions: Acetone was used rather than MIBK, no water cleaning of panel, 100 double rubs are done using a cheese cloth, and the rating scale was as listed below.

| | Description |
|---|---|
| 1 | through to substrate in <50 |
| 2 | Through in 50-100 rubs |
| 3 | Very severely marred. Scratches to metal easily |
| 4 | Severely marred only over area rubbed. Can Scratch to metal |
| 5 | Marred over rub area, can scratch through to metal |
| 6 | Marred uniformly in center of rub area, difficult, but possible to scratch to metal |
| 7 | Non uniform marring over rub area, can not scratch to metal |
| 8 | Scratching, very little marring of rub area, can not scratch to metal |
| 9 | Slight scratching of rub area, can not scratch to metal |
| 10 | No visible damage |

| Paint Example | Description | % Zn Resin Solids | % Bi on Resin Solids | % BCG Additive on Resin Solids | ARD Rating 20' 175 C. | ADR Rubs 20' 175 C. |
|---|---|---|---|---|---|---|
| Example 26 | Control 1.2% Bi | 0 | 1.2 | 0 | 2 | (92)* |
| Example 28 | 1.2% Bi + 2% BCG 2EHGE | 0 | 1.17 | 2 | 7 | 100 |
| Example 31 | BCG low level | 0 | 0 | .7 | 1 | (<45)* |
| Example 32 | BCG low level + Zn | .2 | 0 | .7 | 2 | (87)* |

BCG Additive = 1,5,7-triazabicyclo(4.4.0)dec-5-ene + 2 ethyl hexyl glycidyl ether from Example 4
BCG = 1,5,7-triazabicyclo(4.4.0)dec-5-ene
ADR = Acetone Double Rubs
*Rubbed through to metal in reported rubs

What is claimed is:

1. A coating composition used for coating a substrate via an electrodeposition process, the coating composition comprising:
   a solid resin and a cationic reaction product of reactants comprising:
   a monofunctional compound comprising a monoglycidyl compound comprising an epoxide; and
   cyclic guanidine,
   wherein the electrodepositable coating composition comprises from 0.01% to 7% by weight of cyclic guanidine, based on the total weight of the resin solids of the electrodepositable coating composition, and
   further comprising an acid that neutralizes the reaction product to form a dispersion in water.

2. The coating composition according to claim 1 wherein said cyclic guanidine comprises structure (II) and/or structure (III):

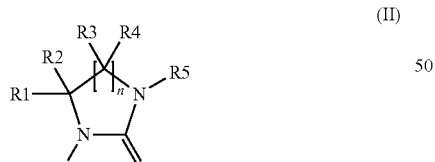

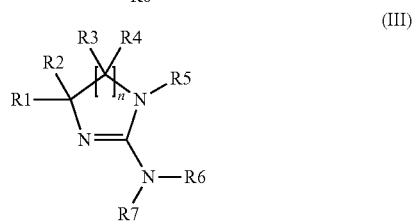

wherein each of R1, R2, R3, R4, R5, R6, R7 comprise hydrogen, (cyclo)alkyl, aryl, aromatic, organometallic, a polymeric structure, or together can form a cycloalkyl, aryl, or an aromatic structure, and wherein R1, R2, R3, R4, R5, R6, and R7 can be the same or different, and wherein $n \geq 1$.

3. The coating composition according to claim 2, wherein $n \geq 2$.

4. The coating composition according to claim 2, wherein $n \geq 3$.

5. The coating composition according to claim 1, wherein said cyclic guanidine is polycyclic and comprises structure (IV) and/or structure (V):

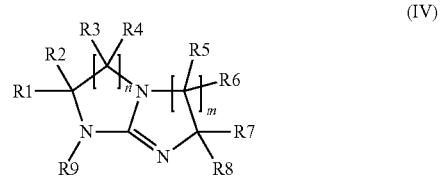

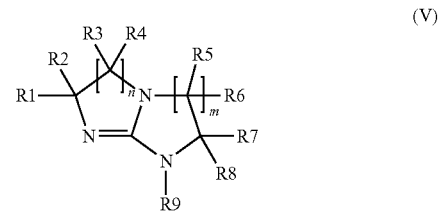

wherein each of R1, R2, R3, R4, R5, R6, R7, R8, or R9 comprises hydrogen, (cyclo)alkyl, aryl, aromatic, organometallic, a polymeric structure, or together can form a cycloalkyl, aryl, or an aromatic structure, and wherein R1, R2, R3, R4, R5, R6, R7, R8, and R9 can be the same or different, and wherein n and m are both $\geq 1$, and wherein n and m may be the same or different.

6. The coating composition according to claim 5, wherein n and m=1.

7. The coating composition according to claim 5, wherein n and m=2.

8. The coating composition according to claim 5, wherein n=1 and m=2.

9. The coating composition according to claim 1, wherein said cyclic guanidine comprises 1,5,7-triazabicyclo[4.4.0]dec-5-ene.

10. The coating composition according to claim 1, wherein the acid neutralizes at least a portion of the reaction product.

11. The coating composition according to claim 1, wherein the coating composition further comprises a polymer.

12. The coating composition according to claim 11, wherein the polymer comprises a blocked isocyanate.

13. The coating composition according to claim 11, wherein the acid neutralizes at least a portion of the polymer.

14. A method for coating a substrate comprising:
(a) introducing the substrate into an electrodeposition bath having an electrodepositable coating composition comprising the coating composition of claim 1; and
(b) electrodepositing said electrodepositable coating composition onto a surface of said substrate to form a coated layer on said surface.

15. The method according to claim 14 further comprising:
(c) curing said coated layer to form a cured film layer on said surface of said substrate.

16. The method according to claim 14, wherein said electrodepositable coating composition further comprises a polymer.

17. The method according to claim 16, wherein said polymer comprises an epoxy functional polymer.

18. The method according to claim 16, wherein said electrodepositable coating composition further comprises an additional component that is reactive with said polymer wherein said additional component comprises a polyamine, a primary amine, a secondary amine, a tertiary amine, a sulfide, or combinations thereof.

19. The method according to claim 18, wherein said additional component comprises a reaction product of said polyamine and a carbonate.

20. The method according to claim 19, wherein said polyamine comprises at least one primary amine and at least one secondary amine.

21. The method according to claim 20, wherein at least a portion of the primary amine of said polyamine is reacted with said carbonate to form a carbamate.

22. The method according to claim 21, wherein the carbonate is a cyclic carbonate.

23. The method according to claim 16, wherein said electrodepositable coating composition further comprises a curing agent.

24. The method according to claim 23, wherein said curing agent comprises a urethane, an isocyanate, an ester, or combinations thereof.

25. The method according to claim 24, wherein the urethane curing agent comprises a reaction product of a polyamine and a carbonate.

26. The method according to claim 25, wherein said carbonate comprises a cyclic carbonate.

27. The method according to claim 23, wherein said curing agent comprises a reaction product of said cyclic guanidine and an isocyanate.

28. The method according to claim 14 wherein said cyclic guanidine comprises structure (II) and/or structure (III):

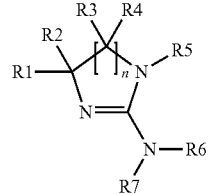

(II)

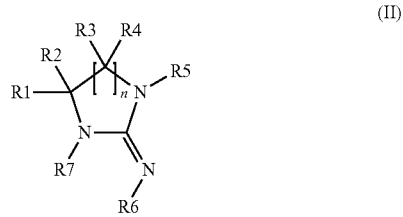

(III)

wherein each of R1, R2, R3, R4, R5, R6, R7 comprise hydrogen, (cyclo)alkyl, aryl, aromatic, organometallic, a polymeric structure, or together can form a cycloalkyl, aryl, or an aromatic structure, and wherein R1, R2, R3, R4, R5, R6, and R7 can be the same or different, and wherein n≥1.

29. The method according to claim 14, wherein said cyclic guanidine is polycyclic and comprises structure (IV) and/or structure (V):

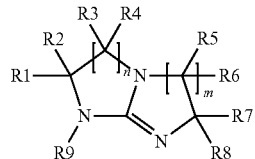

(IV)

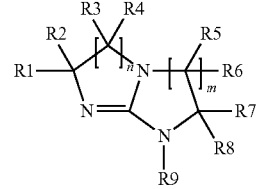

(V)

wherein each of R1, R2, R3, R4, R5, R6, R7, R8, or R9 comprises hydrogen, (cyclo)alkyl, aryl, aromatic, organometallic, a polymeric structure, or together can form a cycloalkyl, aryl, or an aromatic structure, and wherein R1, R2, R3, R4, R5, R6, R7, R8, and R9 can be the same or different, and wherein n and m are both ≥1, and wherein n and m may be the same or different.

30. The method according to claim 14, wherein said cyclic guanidine comprises 1,5,7-triazabicyclo[4.4.0]dec-5-ene.

31. The method according to claim 14, wherein said electrodepositable coating composition further comprises a metal, a metal oxide, a metal salt, an alkyl metal, an alkyl metal oxide, an alkyl metal salt, or combinations thereof.

32. The method according to claim 14, wherein said cyclic guanidine comprises 0.01% to 7% by weight based on weight of the total resin solids of said electrodepositable coating composition.

33. The method according to claim 14, wherein said electrodepositable coating composition further comprises a crater control additive, and wherein said crater control additive comprises an additional cyclic guanidine.

34. The method according to claim 14, wherein said electrodepositable coating composition further comprises a microgel, and wherein said microgel comprises an additional cyclic guanidine.

35. The method according to claim 14, wherein said electrodepositable coating composition further comprises an organo functionalized material of a metal.

* * * * *